US012804026B2

(12) United States Patent
Manchester et al.

(10) Patent No.: US 12,804,026 B2
(45) **Date of Patent: *Nov. 17, 2026**

(54) SITUATION-DEPENDENT DYNAMIC BIT RATE ENCODING AND DISTRIBUTION OF CONTENT

(71) Applicant: Time Warner Cable Enterprises LLC, St. Louis, MO (US)

(72) Inventors: James S. Manchester, New York, NY (US); Wilfred Jaime Miles, Arvada, CO (US); Matthew Zelesko, Doylestown, PA (US); Ethan Wolf, Aurora, CO (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 456 days.

This patent is subject to a terminal disclaimer.

(21) Appl. No.: 18/368,161

(22) Filed: Sep. 14, 2023

(65) Prior Publication Data

US 2024/0007517 A1 Jan. 4, 2024

Related U.S. Application Data

(62) Division of application No. 16/884,225, filed on May 27, 2020, now Pat. No. 11,792,250, which is a
(Continued)

(51) Int. Cl.
*H04L 65/70* (2022.01)
*H04L 65/612* (2022.01)
(Continued)

(52) U.S. Cl.
CPC ............ *H04L 65/70* (2022.05); *H04L 65/612* (2022.05); *H04L 65/762* (2022.05); *H04L 65/80* (2013.01);
(Continued)

(58) Field of Classification Search
CPC ..... H04L 65/70; H04L 65/612; H04L 65/762; H04L 65/80; H04L 65/752; H04N 21/2662; H04N 21/8456
See application file for complete search history.

(56) References Cited

U.S. PATENT DOCUMENTS

| | | | |
|---|---|---|---|
| 8,806,529 | B2 | 8/2014 | Miles et al. |
| 8,910,220 | B2 | 12/2014 | Manchester et al. |

(Continued)

FOREIGN PATENT DOCUMENTS

| | | | |
|---|---|---|---|
| EP | 1022900 | A1 | 7/2000 |
| WO | 2000/003541 | A1 | 1/2000 |

(Continued)

OTHER PUBLICATIONS

"3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 11)" 3GPP Standard; 3GPP TS 26.247, 3rd Generation Partnership Project (3GPP), Mobile Competence Centre ; 650, Route Des Lucioles ; F-06921 Sophia-Antipolis Cedex ; France, vol. SA WG4, No. VII.0.0, Sep. 12, 2012 (Sep. 12, 2012), pp. 1-112, XP050649322.

(Continued)

*Primary Examiner* — Kunal Langhnoja
(74) *Attorney, Agent, or Firm* — Armis IP Law, LLC

(57) ABSTRACT

An encoder resource receives segments of content on one or more data feeds. The encoder resource receives and/or produces encoder control information specifying multiple different bit rate data streams on which to encode the segments of content. As specified by the encoder control information, in accordance with encoding rules, the encoder resource adaptively encodes the segments of content into a varying number of different bit rate data streams. Clients in
(Continued)

a network environment initiate retrieval of the varying number of different bit rate data streams to playback content.

24 Claims, 16 Drawing Sheets

Related U.S. Application Data division of application No. 13/678,593, filed on Nov. 16, 2012, now Pat. No. 10,708,335.

(51) Int. Cl.

| | |
|---|---|
| ***H04L 65/75*** | (2022.01) |
| ***H04L 65/80*** | (2022.01) |
| ***H04N 21/2662*** | (2011.01) |
| ***H04N 21/845*** | (2011.01) |

(52) U.S. Cl.

CPC ..... *H04N 21/2662* (2013.01); *H04N 21/8456* (2013.01)

(56) References Cited

U.S. PATENT DOCUMENTS

2005/0034155 A1* 2/2005 Gordon .............. H04N 21/2365 725/39
2008/0052414 A1* 2/2008 Panigrahi ............. H04N 19/164 375/E7.161
2009/0300204 A1* 12/2009 Zhang ................ H04N 21/4325 709/231
2010/0020886 A1 1/2010 Raveendran et al.
2011/0083145 A1* 4/2011 Cholas ............... H04N 21/2221 725/36
2011/0129201 A1* 6/2011 McLean ............. H04N 21/4532 386/296
2011/0268178 A1 11/2011 Park et al.
2011/0296485 A1 12/2011 Nilsson et al.
2012/0195369 A1 8/2012 Guerrero
2012/0265856 A1 10/2012 Major et al.
2014/0019633 A1 1/2014 Zhang et al.

FOREIGN PATENT DOCUMENTS

WO 2011059286 A2 5/2011
WO 2011087449 A1 7/2011
WO 2011109101 A1 9/2011
WO 2012131424 A1 10/2012

OTHER PUBLICATIONS

EP Supplementary Search Report, Application No. EP13854388, dated Aug. 1, 2016, pp. 9.
International Search Report, PCT/US2013/068422, dated Feb. 24, 2014, pp. 5.
Japanese office action, JP 2015-542684, dated Sep. 1, 2017, pp. 1-10.
Thomas Stockhammer, “Technologies under Consideration for ISO/IEC 23009-1 Dynamic Adaptive Streaming over HTTP”, International Organisation for Standardisation Organisation Internationale De Normalisation ISO/IEC JTC1/SC29/WG11 Coding of Moving Pictures and Audio, ISO/IEC JTC1/SC29/WG11 MPEG2011/N12682, Nov. 2011/Geneva Switzerland, XP030019156, pp. 1-18.

* cited by examiner

FOR CONTENT A: 122-A

| BIT RATE | G.O.D. | HORIZONTAL PIXEL COUNT | VERTICAL PIXEL COUNT | FRAME RATE UPDATE PER SECOND | PROFILE INFO | AUDIO BIT RATE (kbps) | VIDEO BIT RATE (Mbps) | TRANSPORT RATE (Mbps) | NETWORK ADDRESS |
|---|---|---|---|---|---|---|---|---|---|
| ABR1 | N.A. | | | | | | | | |
| ABR2 | N.A. | | | | | | | | |
| ABR3 | N.A. | | | | | | | | |
| ABR4 | A4X | 1280 | 720 | 30 | Main, 3.1 | 96 | 3.32 | 3.41 | URL #AAA4 |
| ABR5 | A5X | 1280 | 720 | 30 | Main, 3.1 | 96 | 2.76 | 2.86 | URL #AAA5 |
| ABR6 | A6X | 960 | 540 | 30 | Main, 3.1 | 96 | 2.18 | 2.27 | URL #AAA6 |
| ABR7 | A7X | 720 | 404 | 30 | Main, 3.0 | 96 | 1.57 | 1.67 | URL #AAA7 |
| ABR8 | A8X | 640 | 360 | 30 | Main, 3.0 | 96 | 1.11 | 1.20 | URL #AAA8 |
| ABR9 | A9X | 480 | 272 | 30 | Baseline | 96 | 0.98 | 1.08 | URL #AAA9 |
| ABR10 | A10X | 320 | 180 | 30 | Baseline | 96 | 0.60 | 0.70 | URL #AAA10 |

FOR CONTENT B: 122-B

| BIT RATE | G.O.D. | HORIZONTAL PIXEL COUNT | VERTICAL PIXEL COUNT | FRAME RATE UPDATE PER SECOND | PROFILE INFO | AUDIO BIT RATE (kbps) | VIDEO BIT RATE (Mbps) | TRANSPORT RATE (Mbps) | NETWORK ADDRESS |
|---|---|---|---|---|---|---|---|---|---|
| ABR1 | B1X | 1920 | 1080 | 30 | High, 4.1 | 96 | 6.22 | 6.32 | URL #BBB1 |
| ABR2 | B2X | 1920 | 1080 | 30 | High, 4.1 | 96 | 4.98 | 5.07 | URL #BBB2 |
| ABR3 | B3X | 1280 | 720 | 30 | Main, 3.1 | 96 | 4.42 | 4.52 | URL #BBB3 |
| ABR4 | B4X | 1280 | 720 | 30 | Main, 3.1 | 96 | 3.32 | 3.41 | URL #BBB4 |
| ABR5 | B5X | 1280 | 720 | 30 | Main, 3.1 | 96 | 2.76 | 2.86 | URL #BBB5 |
| ABR6 | B6X | 960 | 540 | 30 | Main, 3.1 | 96 | 2.18 | 2.27 | URL #BBB6 |
| ABR7 | B7X | 720 | 404 | 30 | Main, 3.0 | 96 | 1.57 | 1.67 | URL #BBB7 |
| ABR8 | B8X | 640 | 360 | 30 | Main, 3.0 | 96 | 1.11 | 1.20 | URL #BBB8 |
| ABR9 | B9X | 480 | 272 | 30 | Baseline | 96 | 0.98 | 1.08 | URL #BBB9 |
| ABR10 | B10X | 320 | 180 | 30 | Baseline | 96 | 0.60 | 0.70 | URL #BBB10 |

FIG. 5

SITUATION-DEPENDENT DYNAMIC BIT RATE ENCODING AND DISTRIBUTION OF CONTENT

RELATED APPLICATION

This application is a divisional application of earlier filed U.S. patent application Ser. No. 16/884,225 entitled "SITUATION-DEPENDENT DYNAMIC BIT RATE ENCODING AND DISTRIBUTION OF CONTENT,", filed on May 27, 2020, the entire teachings of which are incorporated herein by this reference.

U.S. patent application Ser. No. 16/884,225 is a divisional application of earlier filed U.S. patent application Ser. No. 13/678,593 entitled "SITUATION-DEPENDENT DYNAMIC BIT RATE ENCODING AND DISTRIBUTION OF CONTENT,", filed on Nov. 16, 2012, the entire teachings of which are incorporated herein by this reference.

BACKGROUND

Conventional adaptive bit rate (ABR) technology can be used to transmit audio and/or video streams to a decoder device. As a simple example, a network environment can include a server, a communication link, and a client. The client can include the decoder. During operation, and as its name suggests, the decoder decodes a received an encoded data stream from the server and initiates playback of respective content on a playback device.

In accordance with adaptive bit rate technology, the bit rate of transmitting data to the decoder adapts (such as every few seconds) depending on available network bandwidth or other resource bottleneck. As an example, the communication link over which a data stream is transmitted to the decoder (at the client) may experience congestion. In such an instance, the bandwidth for conveying data over the network may significantly drop.

In response to detecting a condition such as decrease in bandwidth availability, a server can be notified by the client to adaptively change a level of quality or bit rate of data transmitted on a respective link to a subscriber playing back the transmitted content. In other words, the client can request data encoded at a lower bit rate or level of quality in response to detecting network congestion.

Transmitting the encoded data from the server at the lower bit rate or level of quality during congestion, as opposed to dropping packets transmitted to the decoder, enables the subscriber to continue playback of the content without interruption, albeit at a lower level of playback quality when congestion is detected. Adaptive bit rate technology is useful because a subscriber typically would like to playback streaming content without pauses, even though a media player must occasionally playback content at lower levels of quality.

In accordance with conventional encoder applications that produce content encoded at different bit rates for adaptive bit rate type applications, each encoder is typically configured to receive a single feed or data channel. The feed can provide linear programs that are to be made available in scheduled time slots. In accordance with conventional encoding, the encoder encodes all of the different types of content received on the feed at the same bit rates.

BRIEF DESCRIPTION OF EMBODIMENTS

Embodiments herein deviate with respect to conventional techniques. For example, one embodiment herein is directed to varying the number of encoded data streams produced at different respective bit rates. As discussed herein, the number of different bit rate data streams can vary depending on any of one or more parameters.

More specifically, in accordance with one embodiment, an encoder resource receives segments of content from an inputted data stream. Each segment of content can enable playback of a respective portion of streaming content. A processing resource produces encoder control information (e.g., rules or guidelines) specifying multiple different bit rate data streams in which to encode the segments of content. The encoder resource receives the encoder control information. As specified by the encoder control information, the encoder resource adaptively encodes the segments of content into a varying number of different bit rate data streams available to subscribers in, for example, a cable network environment.

As discussed herein, any of multiple parameters can be used as a basis for adjusting the number of generated different bit rate data streams. As an example, the content received by the encoder resource can include one or more different types of programs. In one embodiment, depending on a type of the received program (e.g., newscast, sports event, action movie, etc.), the encoder resource produces a different number of available levels of quality or bit rate data streams. In further embodiments, the encoder resource adjusts the number of generated data streams within a program, as opposed to changing the number of data streams from program to program.

Assume that in one embodiment, the encoder resource receives a first program on a data feed such as a newscast. The newscast may include relatively few bits of data because there is little change from one scene to another. In such an instance, there is no need to generate highest levels of quality data streams, since lower bit rate data streams would be sufficient to play back images, audio, etc. Based on received encoder control information produced specifically for the newscast, the encoder resource encodes the newscast as lower bit rate data streams below a threshold level.

The encoder resource can receive a second program on the feed such as an action movie. The action movie may require substantially more bits (e.g., defining pixel settings of a display screen) of data than the newscast because it includes many fast changing scenes. In this latter instance, for the action movie, there is a need to generate highest level bit rate data streams, since lower bit rate data streams would not be sufficient to play back corresponding images, audio, etc., as captured by the action scenes at a sufficiently high level of quality. Based on received encoder control information produced specifically for the action movie, the encoder resource encodes the action movie to include higher bit rate data streams.

As discussed herein, the encoder control information indicating one or more different bit rates in which to encode the received content can be received in any suitable manner. For example, the encoder control information can be received by the encoder control information as metadata (e.g., in-band signal) included in received streaming content. As one possible alternative, the encoder control information can be received in an out-of-band signal with respect to received streaming content. As another alternative, the encoder resource can analyze received content and generate the encoder control information locally, and so on.

In accordance with another embodiment, an encoder resource receives original segments of content. Each of the original segments of content includes data bit information specifying how to reproduce a rendition of the respective original segment on playback. The encoder resource or other suitable resource analyzes the original segments of content. For example, the encoder resource analyzes a magnitude of complexity associated with each respective original segment of content. Based at least in part on the magnitude of complexity of each of the respective original segments or group of segments, the encoder resource dynamically adjusts a number of different bit rate data streams into which the original segments of content are encoded.

Complexity of the analyzed content to be encoded can be measured in any suitable manner. In one embodiment, the magnitude of complexity varies based on parameters such as variations of pixels settings within the same frame, setting variations amongst the same pixels across multiple frames, amount of motion in the sequence of images, changes in pixel settings amongst the sequence of images, etc. More complex images in a sequence are classified as being a higher respective complexity requiring more bits of data to maintain a level of quality. Less complex images in a sequence are classified at lower complexity and require fewer bits of data to maintain a level of quality.

As an example, most segments of newscast-type may include, on average, relatively few bits of data as previously discussed. The encoder resource can be configured to encode these segments into multiple different bit rate data streams in a specified range between lower and medium levels of quality. In certain instances, however, the newscast may include higher complexity action scenes including substantially higher amounts of data bit information to render corresponding action images. For example, instead of including a display of talking announcers, the newscast may changes to showing a fiery explosion, which requires many data bits of data to capture the images. In such an instance, to account for the higher amount of data bit information and/or higher complexity, and accommodate playback of the action scenes at a high level of quality, the encoder resource adjusts the amount of data streams into which the segments are encoded to include higher bit rate data streams enabling higher level of quality playback. When the magnitude of data bit information per segment decreases again, such as when the received content captures low complexity images again such as talking persons against a non-changing background again, the encoder resource can be configured to discontinue producing one or more higher level of quality data streams because an appropriate level of image quality can be provided at the lower adaptive bit rates.

As another example, most segments of action-type content (e.g., more complex content) such as an action movie may include, on average, a higher number of bits of data. The encoder resource can be configured to generally encode these segments into multiple different bit rate data streams in a range between a lower and a highest level of quality available. In certain instances, however, the action-type content may include low complexity action scenes including substantially fewer amounts of data bit information to render corresponding low action images. In such an instance, to account for the lower complexity images (such as because the scenes do not change quickly), and yet still accommodate playback of the low action scenes at a reasonably high level of quality, the encoder resource adjusts the amount of data streams to include fewer higher bit rate data streams because they are not needed for the lower complexity images. When the magnitude of complexity per segment increases again, the encoder resource reverts to producing the action-type content in a range between the lowest and highest available level of quality.

These and other more specific embodiments are disclosed in more detail below.

Any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate distribution of content according to one or more different levels of quality from a server. The instructions, when executed by a processor of a respective computer device, cause the processor or multiple processors of the system to: receive segments of content from an inputted data stream; receive encoder control information specifying multiple different bit rate data streams in which to encode the segments of content; and as specified by the encoder control information, adaptively encode the segments of content into a varying number of different bit rate data streams available to subscribers in a cable network environment.

Yet another embodiment includes a computer readable storage medium and/or system having instructions stored thereon to facilitate distribution of content according to one or more different levels of quality from a server. The instructions, when executed by a processor of a respective computer device, cause the processor or multiple processors of the system to: receive original segments of content; analyze a magnitude of data bit information included in each respective original segment of content, the data bit information specifying how to reproduce a rendition of the respective original segment on playback; and dynamically adjust a number of different bit rate data streams into which the original segments of content are encoded based at least in part on the magnitude of data bit information in each of the respective original segments.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, hardware alone such as within a processor, within an operating system, within a software application, etc.

As discussed herein, techniques herein are well suited for use in the field of variable encoding and distributing different levels of quality of adaptive bit rate encoded content in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 5 is an example diagram illustrating content access information indicating multiple network addresses from which to retrieve different bit rate encoded segments of content according to embodiments herein.

Figure 1:
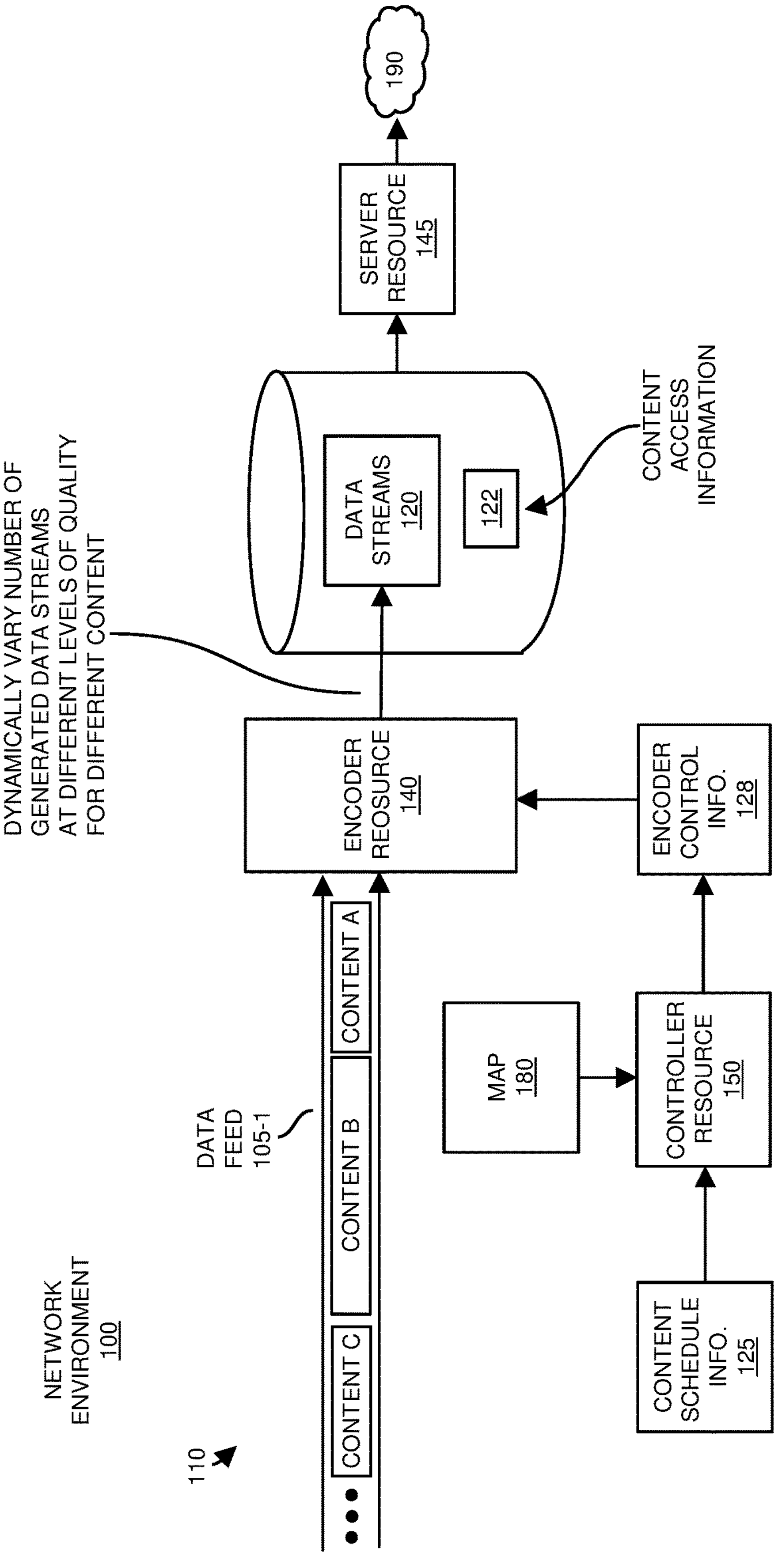
FIG. 1 is an example diagram illustrating a network environment facilitating variable encoding and distribution of content at different levels of quality according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As mentioned, according to one embodiment, an encoder resource receives segments of content from an inputted data stream. The encoder resource also receives and/or produces encoder control information specifying multiple different bit rate data streams in which to encode the segments of content. As specified by the encoder control information, the encoder resource adaptively encodes the segments of content at varying bit rates or levels of quality for distribution (e.g., via broadcast, unicast, multicast, etc.) to subscribers in a network environment.

More specifically, FIG. 1 is an example diagram illustrating a network environment facilitating encoding and distribution of content at different levels of quality according to embodiments herein.

As shown, network environment 100 includes encoder resource 140. Encoder resource 140 receives streaming content such as content A, content B, Content C, etc., on data feed 105-1. The content 110 (such as content A, Content b, Content C) can represent a portion of the same or different programs.

Data feed 105-1 (or inputted data stream) can be any suitable type of medium or communication link such as a fiber, coaxial cable, twister pair, etc., on which to receive content. Content 110 received on data feed 105-1 can be and/or include any suitable type of information such as video data, audio data, etc.

The content 110 received on data feed 105-1 can be received in any suitable form. For example, as will be discussed later in this specification, the received content can be partitioned into segments. Each of the segments enables playback of a certain portion of the respective streaming content. As an example, the received content may be video data. Each segment of the content enables playback of a respective portion of the video.

The encoder resource 140 can receive content 110 in any suitable manner. For example, the segments of content 110 can be interleaved amongst each other. In other embodiments, the data feed 105-1 conveys segments of content A in a serial manner from start to finish (in or out of logical playback order), followed by conveyance of content B on the data feed 105-1 in a serial manner from start to finish (in or out of logical playback order), etc.

In this example embodiment, assume that the encoder resource 140 receives encoder control information 128 from any suitable type of resource such as controller resource 150. Controller resource 150 can be located at any suitable location in network environment 100. In one embodiment, the controller resource 150 can be remotely located over a network with respect to the encoder resource 140.

By way of a non-limiting example, the encoder resource 140 can receive the encoder control information 128 on an out-of-band signal with respect to the data feed 105-1 on which content 110 is received. That is, the in one embodiment, the encoder control information 128 can be received on a physically different communication link than the physical communication link (e.g., data feed 105-1) on which the content 110 is received.

In one embodiment, the controller resource 150 generates the encoder control information 128 based on input such as content schedule information 125 and map 180. As its name suggests, content schedule information 125 can include information about the content received on data feed 105. For example, the content schedule information 125 can indicate when the different content will be received and/or made available for viewing, the classification of the content to be encoded, etc.

Map 180 indicates one or more predetermined levels of quality (i.e., bit rates) for a respective type of content to be encoded.

In one non-limiting example embodiment, the controller resource 150 utilizes the map 180 as a basis to determine what different levels of quality or bit rates in which to encode the corresponding content 110. (See discussion in FIG. 2 for more particular description of embodiments).

In accordance with the encoder control information 128, the encoder resource 140 produces data streams 120. As previously discussed, the encoder control information 128 specifies multiple different bit rate data streams in which to encode the segments of content 110. For example, the encoder control information 128 can indicate to encode content A according to a first set of (varying or constant bit rates); the encoder control information 128 can indicate to encode content B according to a second set of (varying of constant) bit rates; the encoder control information 128 can indicate to encode content C according to a third set of (varying or constant) bit rates; and so on.

As specified by the encoder control information, the encoder resource 140 adaptively encodes the segments of content 110 into a varying number of different bit rate data streams 120.

In accordance with one non-limiting example embodiment, subsequent to encoding, the server resource 145 selectively distributes (e.g., unicasts, broadcasts, multicasts, etc.) the different bit rate data stream 120 to subscribers over network 190. By way of a non-limiting example, the network 190 can be a cable network environment in which one or more subscribers request and retrieve data streams 120 in accordance with an IPTV (Internet Protocol TeleVision) protocol.

In addition to generating data streams 120, encoder resource 140 or other suitable resource generates content access information 122. As its name suggests, in one embodiment, the content access information 122 indicates information such as availability of the different data streams 120 (i.e., segments of content encoded in accordance with one or more different bit rates), attributes of the different data stream 120, a location such as one or more network address from which to retrieve the data stream 120, etc.

Figure 2:
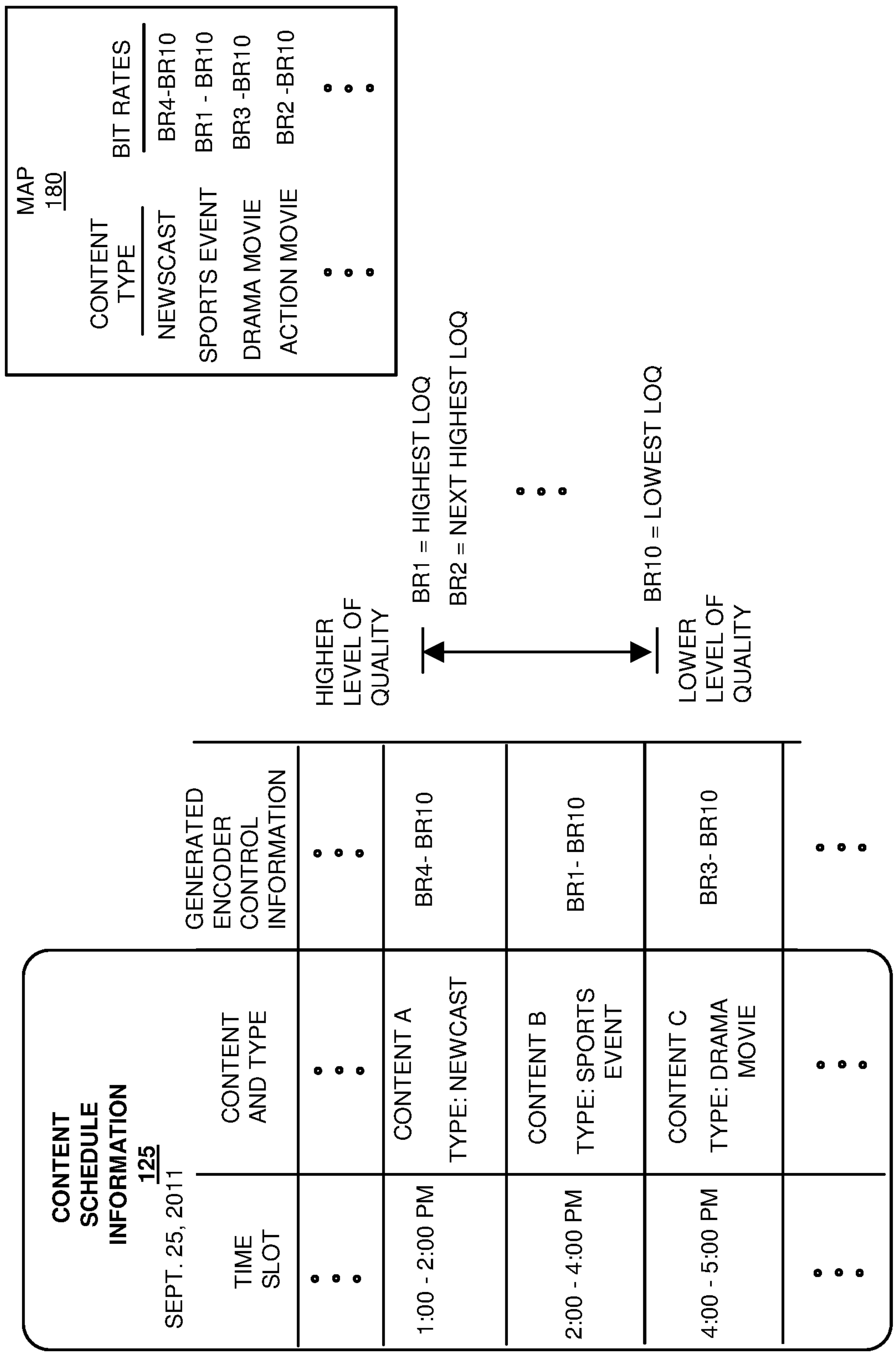
FIG. 2 is an example diagram illustrating content schedule information according to embodiments herein.

FIG. 2 is an example diagram illustrating content schedule information and different bit rates in which to encode content according to embodiments herein.

In this non-limiting example, content schedule information 125 indicates the different types of content to be received on the data feed 105-1. As shown, the content schedule information 125 can include timing information indicating when the different types of content will be received on the data feed 105-1. Portions of the received content can include unique identifier information indicating a respective content stream to which the data belongs.

In this example, as specified by the content schedule information 125, content A is scheduled for receipt in a first time slot between approximately 1:00 pm and 2:00 pm; content B is scheduled for receipt in a second time slot between approximately 2:00 pm and 4:00 pm; content C is scheduled for receipt in a third time slot between approximately 4:00 pm and 6:00 pm; and so on.

In this example embodiment, assume that the content A represents a first program of content; content B represents a second program of content; content C represents a third program of content, etc.

The different content 110 (e.g., content A, content B, C, etc.) can be unrelated. For example, as shown, content A may be video of a newscast; content B may be video of a sports event; content C may be video of an action movie, etc. Thus, the different content to be encoded into different data streams 120 can be classified by a corresponding genre.

As previously discussed, map 180 indicates the different bit rates in which to encode the different types of content. The range of possible bit rates can include, from highest to lowest level of quality, bit rate BR1 (e.g., the highest level of quality encoding bit rate), bit rate BR2, bit rate BR3, bit rate BR4, bit rate BR5, bit rate BR6, bit rate BR7, bit rate BR8, bit rate BR8, and bit rate BR10 (e.g., the lowest level of quality encoding bit rate).

In this example embodiment, map 180 indicates to encode segments of newscast-type content (e.g., video of talking heads that typically can be encoded with relatively few data bits) in a range between bit rate BR4 and bit rate BR10. When generating encoder control information 128 for content A in the time slot between 1:00 pm and 2:00 pm, because classification information in content schedule information 125 indicates that content A is newscast-type content, the controller resource 150 produces first encoder control information 128 to specify encoding of content A according to a first number of different bit rate data streams in accordance with bit rates BR4 through BR10 (e.g., a total of seven different bit rate data streams 120). In accordance with this encoder control information 128, during encoding, the encoder resource 140 encodes the segments of content A into the seven different bit rate data streams (e.g., BR4, BR5, . . . , BR10) as specified by the first encoder control information.

Further in this example embodiment, map 180 indicates to encode sports events-type content (e.g., video of an NFL football game typically captured in high resolution requiring many data bits) in a range between bit rate BR1 and bit rate BR10. When generating encoder control information 128 for content B in the time slot between 2:00 pm and 4:00 pm, because classification information in content schedule information 125 indicates that content B is sports event-type content, the controller resource 150 produces second encoder control information 128 to specify encoding of content B according to a second number of different bit rate data streams in accordance with bit rates BR1 through BR10 (e.g., a total of ten different bit rate data streams 120). In accordance with this encoder control information 128, during encoding, the encoder resource 140 encodes the segments of content B into the ten different bit rate data streams (e.g., BR1, BR2, . . . , BR10) as specified by the second encoder control information.

Still further in this example embodiment, map 180 indicates to encode drama movie-type content (e.g., video of a drama movie) in a range between bit rate BR3 and bit rate BR10. When generating encoder control information 128 for content C in the time slot between 4:00 pm and 5:00 pm, because classification information in content schedule information 125 indicates that content C is drama movie-type content, the controller resource 150 produces third encoder control information 128 to specify encoding of content C according to a third number of different bit rate data streams in accordance with bit rates BR3 through BR10 (e.g., a total of eight different bit rate data streams 120). In accordance with this encoder control information 128, during encoding, the encoder resource 140 encodes the segments of content C into the eight different bit rate data streams (e.g., BR3, BR4, . . . , BR10) as specified by the third encoder control information.

Thus, a first portion of content 110 such as segments of content A as received on data feed 105-1 in a first time slot can be encoded in accordance with a first number of bit rates; a second portion of content 110 such as segments of content B as received on data feed 105-1 in a second time slot can be encoded in accordance with a second number of bit rates; a third portion of content 110 such as segments of content C as received on data feed 105-1 in a third time slot can be encoded in accordance with a third number of bit rates; and so on.

As discussed above by way of a non-limiting example, the data feed 105-1 can be a linear channel including multiple programs (e.g., content A, content B, etc.) of content 110 to be made available in different time slots. The controller resource 150 or other suitable resource produces the encoder control information 128 based on scheduling times (such as time slots) and/or classification types (such as genre types) of the multiple programs.

The encoder control information 128 can include suitable information to match the corresponding bit rate information to the content being received. For example, the encoder control information 128 can specify that the content received on the data feed 105-1 between 1:00 pm and 2:00 pm will be encoded in accordance with bit rates BR4 through BR10 as discussed above; the encoder control information 128 can specify that the content received on the data feed 105-1 between 2:00 pm and 4:00 pm will be encoded in accordance with bit rates BR1 through BR10 as discussed above; and so on.

The different content also can be specified by title rather than time on which data is received on data feed 105-1. For example, the encoder control information 128 can indicate to encode content of first title received on data feed 105-1 in accordance with a first set of bit rates (e.g., seven different bit rates); the encoder control information 128 can indicate to encode content of second title received on data feed 105-1 in accordance with a second set of bit rates (e.g., ten different bit rates); and so on.

As specified by the encoder control information, the encoder resource 140 varies a number of bit rates of encoding segments of respective scheduled content received on the data feed 105-1.

As will be discussed later in this specification, the number of bit rates of encoding respective content received in a time slot can vary depending on one or more different or alternative types of input. For example, as further discussed herein, the encoder resource 140 or other suitable resource can be configured to analyze the segments of content to determine bandwidth requirements to transmit the segments of content on different bit rate data streams in a network environment. The encoder resource 140 dynamically adjusts a number of different bit rate data streams into which the segments of content are encoded based at least in part on the bandwidth requirements associated with the segments. That is, certain segments of received content may capture a fast-changing scene of content. In such an instance, the segments of content can be encode data newly added, one or more higher levels of quality or bit rates.

Figure 3:
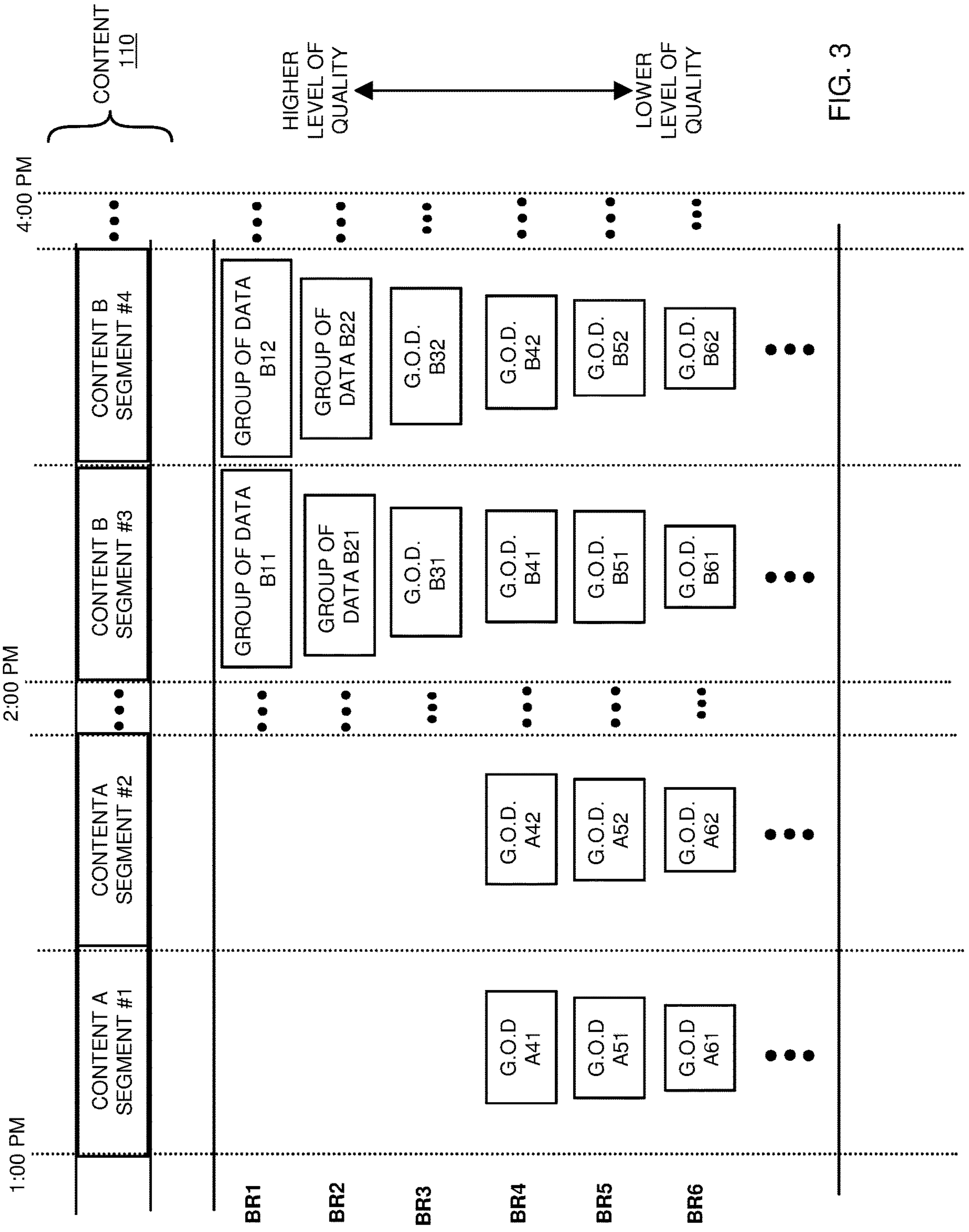
FIG. 3 is an example diagram illustrating encoding of content at multiple different bit rates, levels of quality, etc., according to embodiments herein.

FIG. 3 is an example diagram illustrating encoding of content at multiple different bit rates according to embodiments herein.

As shown, content A received on data feed 105-1 is partitioned into logical segment #1, segment #2, . . . ; content B received on data feed 105-1 is partitioned logical segment #1, segment #2, . . . ; and so on. Each segment can be encoded to include information representing a same or different amount of playback time.

Groupings of encoded data produced by encoder resource 140, are shown in the form Axy, where x=the bit rate of encoding and y=segment number of content encoded.

Encoding of the segments of content at the different bit rates affords playback at different levels of quality. For example, groupings of data A41, A42, etc., include more encoded data than a next lower bit rate including groupings of data A51, A52, etc. Thus, encoded segments of content at bit rate BR4 enable a high level of quality playback than bit rate BR5; encoded segments of content at bit rate BR5 enables a high level of quality playback than bit rate BR6; and so on.

In accordance with the encoder control information 128 produced for content A in time slot between 1:00 pm and 2:00 pm, the encoder resource 140 encodes segment #1 of content A as grouping of data A41 (at bit rate BR4), grouping of data A51 (at bit rate BR5), grouping of data A61 (at bit rate BR6), and so on. The encoder resource 140 encodes segment #2 of content A as grouping of data A42 (at bit rate BR4), grouping of data A52 (at bit rate BR5), grouping of data A62 (at bit rate BR6), and so on.

In accordance with the encoder control information 128 produced for content B in time slot between 2:00 pm and 4:00 pm, the encoder resource 140 encodes content B at more levels of quality. For example, the encoder resource 140 encodes segment #1 of content B as grouping of data B11 (at bit rate BR1), grouping of data B21 (at bit rate BR2), grouping of data B31 (at bit rate BR3), grouping of data B41 (at bit rate BR4), grouping of data B51 (at bit rate BR5), grouping of data B61 (at bit rate BR6), and so on; the encoder resource 140 encodes segment #2 of content B as grouping of data B12 (at bit rate BR1), grouping of data B22 (at bit rate BR2), grouping of data B32 (at bit rate BR3), grouping of data B42 (at bit rate BR4), grouping of data B52 (at bit rate BR5), grouping of data B62 (at bit rate BR6), and so on.

The higher bit rate encoded segments of content require a higher bandwidth transport stream in order for a client to receive and playback content without pauses (e.g., without having to wait for next data in the sequence to be available).

Figure 4:
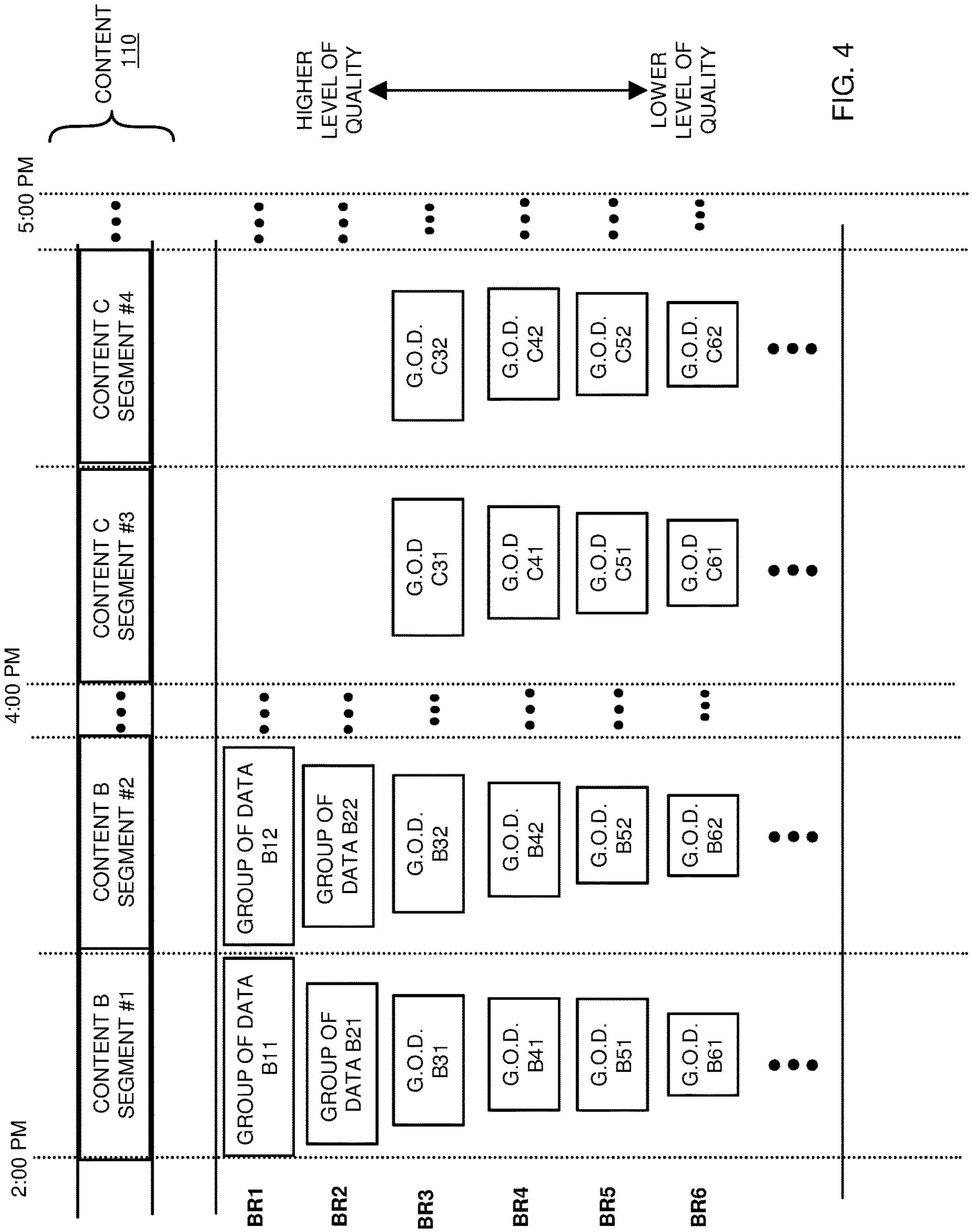
FIG. 4 is an example diagram illustrating encoding of content at multiple different bit rates according to embodiments herein.

FIG. 4 is an example diagram illustrating encoding of content at multiple different bit rates according to embodiments herein.

As shown, FIG. 4 illustrates a transition between encoding content B in the time slot between 2:00 pm and 4:00 pm and encoding content C in the time slot between 4:00 pm and 5:00 pm.

The encoding of content B was discussed in FIG. 3. Referring to FIG. 4, in accordance with the encoder control information 128 produced for content C in time slot between 4:00 pm and 5:00 pm, the encoder resource 140 encodes content C at fewer levels of quality. For example, the encoder resource 140 encodes segment #1 of content C as grouping of data C31 (at bit rate BR3), grouping of data C41 (at bit rate BR4), grouping of data C51 (at bit rate BR5), grouping of data C61 (at bit rate BR6), and so on; the encoder resource 140 encodes segment #2 of content C as grouping of data C32 (at bit rate BR3), grouping of data C42 (at bit rate BR4), grouping of data C52 (at bit rate BR5), grouping of data C62 (at bit rate BR6), and so on.

FIG. 5 is an example diagram illustrating content access information including specification information and multiple network addresses from which to retrieve content encoded at different levels of quality (different bit rates) according to embodiments herein.

As shown, content access information 122-A indicates the availability of encoded segments of content A (e.g., groupings of encoded data Axy, where x=the bit rate of encoding and y=segment number of content encoded as discussed above). In accordance with the content access information 122-A, the content A is not available at the bit rates BR1, BR2, and BR3 because the content was not encoded at such high bit rates. The content access information 122-A does indicate that the content A is available and has been encoded at bit rates BR4, BR5, BR6, . . . , BR10.

In addition to specifying the bit rates and encoded groupings of data available for retrieval, the content access information 122-A indicates attributes (e.g., playback attributes, streaming attributes, etc.) of the encoded content as well as one or more network addresses from which to retrieve the content encoded at the different bit rates. Thus, the content access information 122 indicates availability of the segments of content according to the varying number of bit rate data streams in which respective segments are encoded.

In a similar manner as discussed above, the encoder resource 140 or other suitable resource produces the content access information 122. In this example embodiment, content access information 122-B indicates attributes encoded content B.

As discussed herein, the number of bit rates into which different segments of, for example, content A are encoded can vary. In such an instance, the respective content access information 122 is continuously updated to reflect the availability of content A at the varying bit rates.

Figure 6:
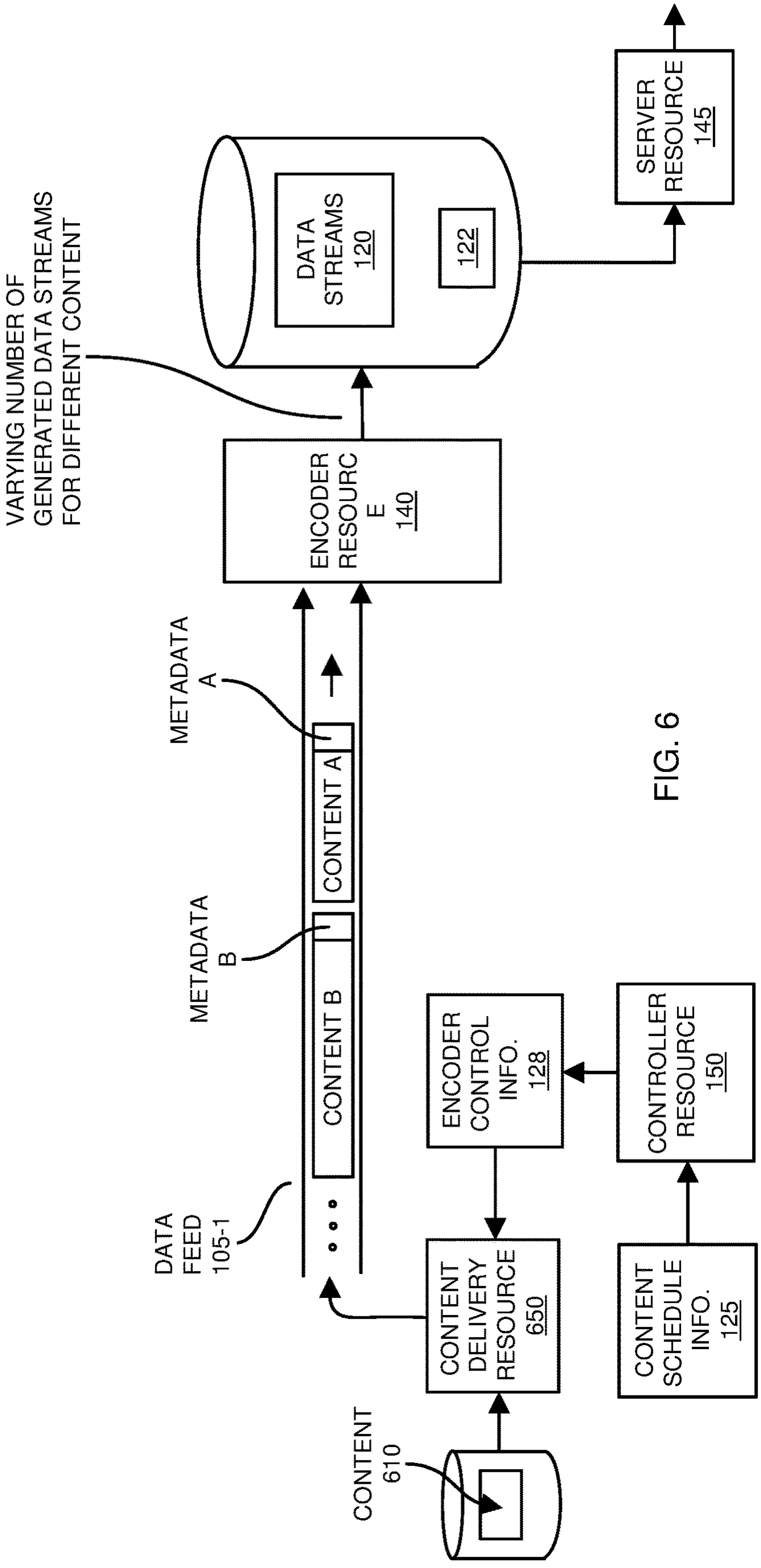
FIG. 6 is an example diagram illustrating inclusion of metadata such as encoder control information in a transport stream to control an encoder resource according to embodiments herein.

FIG. 6 is an example diagram illustrating inclusion of metadata in a transport stream to control an encoder resource according to embodiments herein.

As previously discussed, the encoder resource 140 can receive the encoder control information 128 in an out-of-band channel with respect to data feed 105-1. In accordance with another embodiment as in FIG. 6, the encoder resource 140 can receive the encoder control information 128 as respective metadata in the regarding stream of content.

For example, controller resource 150 can be configured to produce encoder control information 128 in manner as previously discussed. Content delivery resource 650 receives content 610 to be transmitted on data feed 105-1. The content delivery resource 650 interleaves the encoder control information 128 as metadata and/or as marker information in each of the content streams. For example, the content delivery resource 650 inserts encoder control information associated with content A as metadata A into content data stream A transmitted on data feed 105-1; the content delivery resource 650 inserts encoder control information associated with content B as metadata B into content data stream B transmitted on data feed 105-1, and so on. The encoder resource 140 monitors the data stream received on data feed 105-1 and retrieves the encoder control information 128 as stored in metadata.

Note that the metadata can be included in any portion of the respective transport stream that conveys the content. For example, as shown, the transport stream conveying content A can include metadata A indicating to encode the respective payload (e.g., content A) in the transport stream in accordance with bit rates BR4-BR10; the transport stream conveying content B can include metadata B indicating to encode the respective payload (e.g., content B) in the transport stream in accordance with bit rates BR1-BR10, and so on.

The metadata can be divided up and/or included at any location of the respective transport stream. In one non-limiting example embodiment, each received portion of metadata indicates to the encoder resource 140 how to encode following received content. In this manner, the content delivery resource 650 can notify the encoder resource 140 how to encode the different streaming content transmitted on data feed 105-1 without having to transmit such information on an out-of-band channel with respect to data feed 105-1.

The encoder resource receives the segments of content on the data feed 105-1 and monitors the data feed 105-1 for metadata. The encoder resource 140 retrieves the encoder control information from the metadata on the inputted transport stream including content to be encoded at one or more different levels of quality. As previously discussed, the encoder control information can change within a respective data stream to continuously change encoding of the content at different bit rates.

Figure 7:
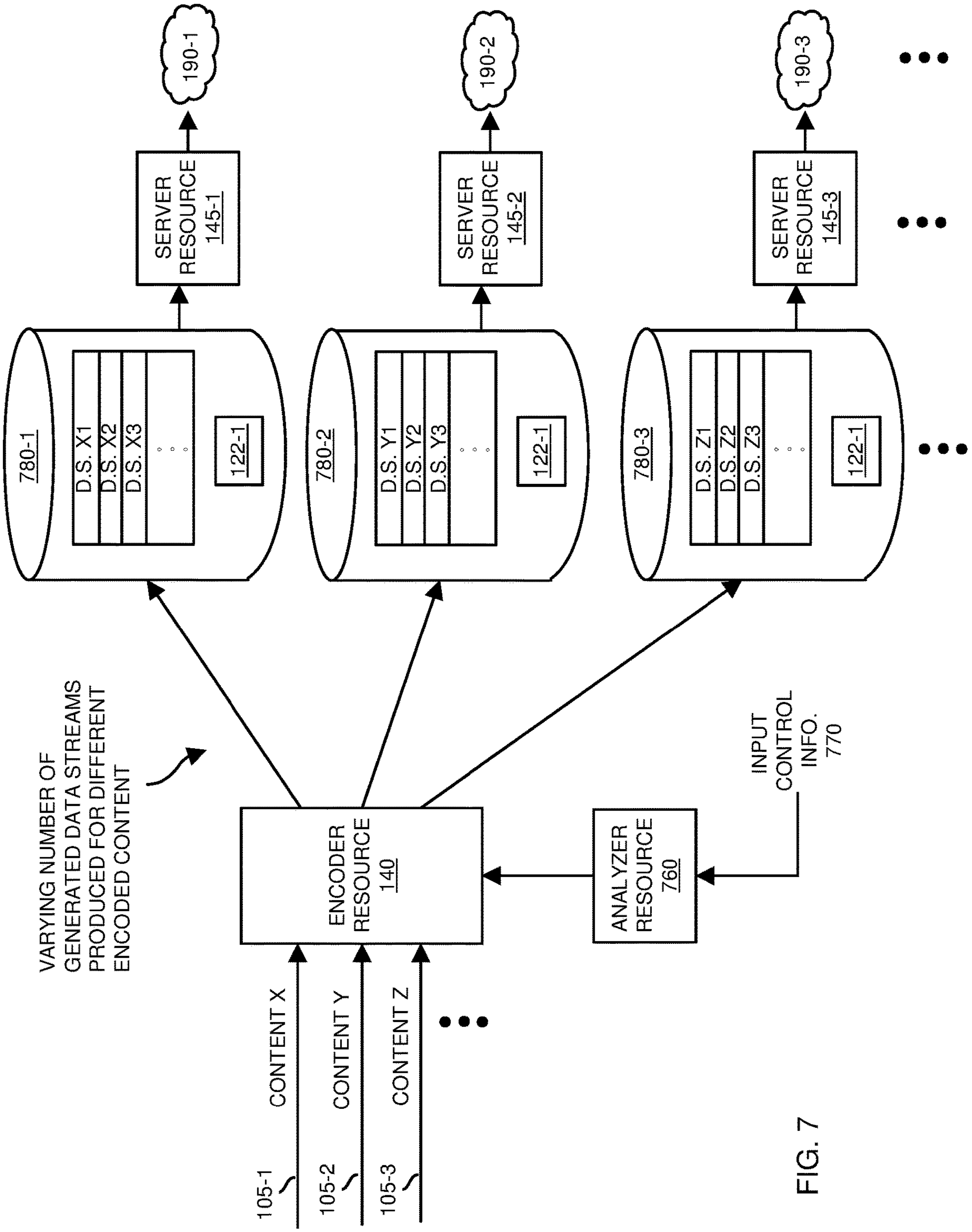
FIG. 7 is an example diagram illustrating an encoder resource configured to receive multiple streams of content on multiple feeds and modification of encoding bit rates according to embodiments herein.

FIG. 7 is an example diagram illustrating an encoder resource configured to receive multiple stream of content on multiple feeds and modification of encoder bit rates according to embodiments herein.

As shown, encoder resource 140 can be configured to receive any number of logical streams of content for encoding. The logical streams can be received as one or more multi-stream data channels, one or more single stream data channels, etc.

In one non-limiting example embodiment, the encoder resource includes multiple parallel processing devices to produce encoded segments of content in different bit rate data streams. The processing resources can be dynamically allocated for use depending on the different bit rate data streams that need to be generated over time.

In this example embodiment, the encoder resource 140 varies the bit rate of encoding content received on each of one or more of the data feeds including data feed 105-1, data feed 105-2, data feed 105-3, etc. The encoder resource 140 stores the variable encoded content in repositories 780-1, 780-2, 780-3, etc., for subsequent distribution by server resources 145.

In one embodiment, server resource 145-1 distributes the variable bit rate encoded data streams X1, X2, X3, etc., over network 190-1 to subscribers; server resource 145-2 distributes the variable bit rate encoded data streams Y1, Y2, Y3, etc., over network 190-2 to subscribers; server resource 145-3 distributes the variable bit rate encoded data streams Z1, Z2, Z3, etc., over network 190-3 to subscribers, and so on.

In a manner as previously discussed, the encoder resource 140 can be configured to encode the different content in accordance with corresponding encoder control information 128.

In further example embodiments, note that any suitable control parameter input (as an alternative to or in addition to the content schedule information 125) can be used as a basis to adaptively change the number of encoded bit rate data streams for the different received content on an as-needed basis.

For example, analyzer resource 760 can be configured to receive input control information 770 such as feedback information.

In one embodiment, the input control information 770 indicates a degree of congestion in one or more networks on which encoded segments of content are distributed to subscribers in a cable network environment. In response to detecting congestion in network 190-1 above a threshold value, the analyzer resource 760 (via generation of encoder control information such as in substantially real-time) can adjust settings of the encoder resource 140. The encoder control information produced can override settings produced by controller resource 150. For example, in accordance with control input produced by analyzer resource 760, the encoder resource 140 can be configured to reduce the number of available bit rate data streams at the higher levels of quality when encoding data streams X because of an instance in which there is insufficient bandwidth available to transmit the higher level of quality data streams X over network 190-1 Eliminating encoding at the higher bit rate can save encoder resources, storage space, network bandwidth of transmitting content, etc.

Thus, in accordance with one embodiment, the analyzer resource 760 can produce encoder control information to eliminate encoding the segments of content X on at least one of the multiple different bit rate data streams to free bandwidth in network 190-1 over which at least portions of the encoded data streams of X are transmitted.

Reducing the number of encoded data streams for content X in this example frees up the encoder resource 140 to increase a number of bit rate data streams produced for another channel. For example, eliminating higher level of quality data streams in data stream X enables the encoder resource 140 to instead use freed up encoding resources to produce one or more higher level of quality data streams in another channel such as content Z. Thus, encoding at different bit rates can be load-balanced depending on one or more suitable types of input control information. More specifically, in this manner, the encoder resource 140 is able to, on an as-needed basis such as within time slots, vary bit rates of encoding the segments of content based at least in part on an amount of bandwidth available in the cable network environment on which to transmit the encoded segments of content.

The feedback information (e.g., input control information 770) used dynamically adjust generation of different bit rate data streams can include any suitable type of information. For example, via input control information 770, the analyzer resource 760 can monitor the ability to store encoded data streams in respective repositories 780. If resources in a respective repository become unavailable or reach capacity, the analyzer resource 760 can be configured to reduce one or more bit rate data streams.

In certain instances, one or more of server resources 145 may become a bottleneck in distributing the encoded content to respective subscribers. In such an instance, it may be desirable to eliminate one or more bit rate data stream (e.g., one or more higher level of quality data streams) to reduce the burden of delivering respective requested content to clients.

Figure 8:
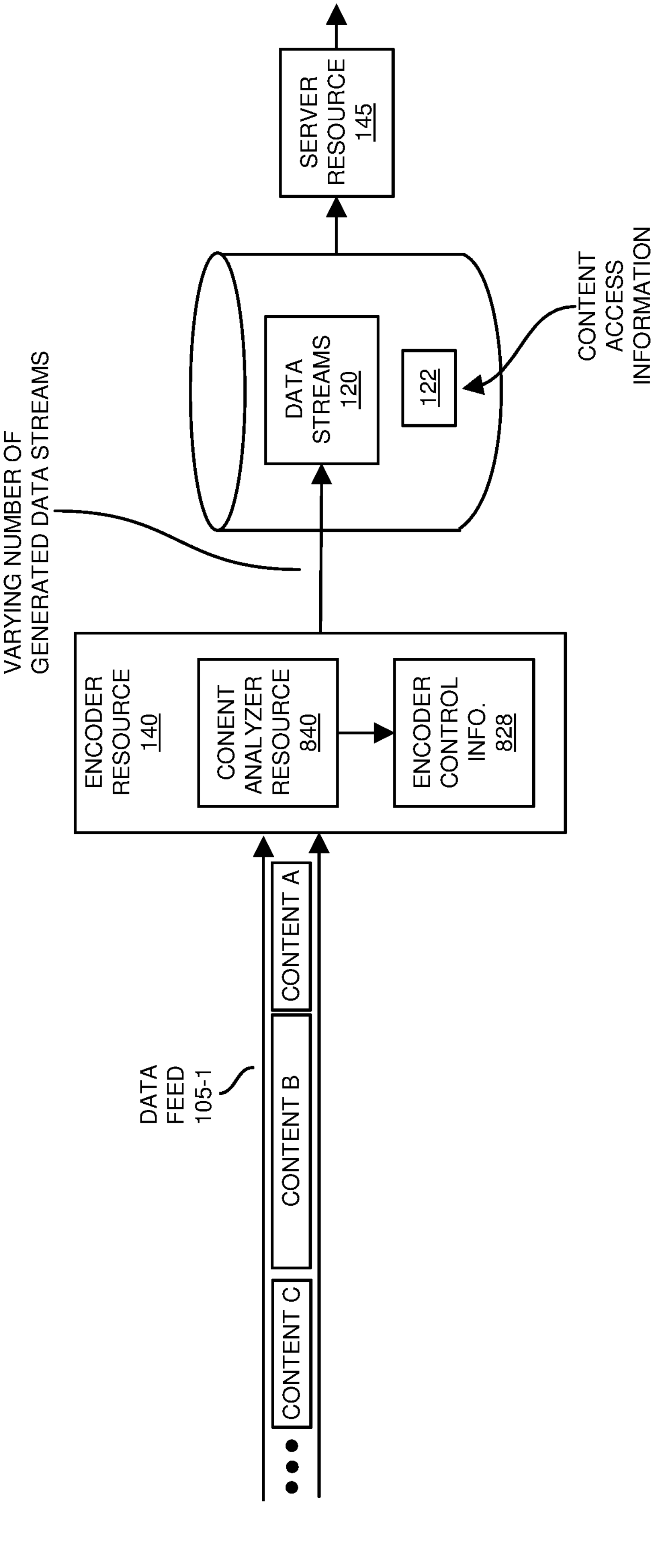
FIG. 8 is an example diagram illustrating analysis of content to vary encoding bit rates of segments of content according to embodiments herein.

FIG. 8 is an example diagram illustrating analysis of content to vary encoding bit rates according to embodiments herein.

In one embodiment, the encoder resource 140 includes content analyzer resource 840. The content analyzer resource 840 can be located within encoder resource 140 or located at a remotely located resource over a network.

As previously discussed, the encoder resource 140 can receive original segments of content A, content B, content C, etc., on data feed 105-1. The content analyzer resource 140 initially decodes the received segments. Thereafter, the content analyzer resource 840 analyzes a complexity of each respective original segment of content. Complex scenes (e.g., fiery explosions, fine blades of grass swaying in the window, etc.) such as scenes in an action movie typically require high magnitudes of data bits to capture such images at a reasonable level of quality; less complex scenes such as images of a respective newscast (e.g., talking persons against such as static background) typically require fewer data bits to capture respective images at a reasonable level of quality.

As previously discussed, the data bit information in each segment of content (which may vary from segment to segment) received on data feed 105-1 indicates how to reproduce a rendition of the respective original segment under test on playback. In one non-limiting example embodiment, the encoder resource 140 dynamically adjusts a number of different bit rate data streams into which the original segments of content are encoded based at least in part on the complexity of each of the respective original segments.

An example of a highly complex image is an image in which each picture element in the image is set to a different color setting value than all of the other picture elements in the image. Encoding of such an image is difficult without being lossy.

An example of a least complex image is an image in which each picture element in the image is set to the same color setting value as all of the other picture elements in the image. Encoding of such an image is simple.

Note that there are many different grades of complexity in between these two sample extremes.

Figure 9:
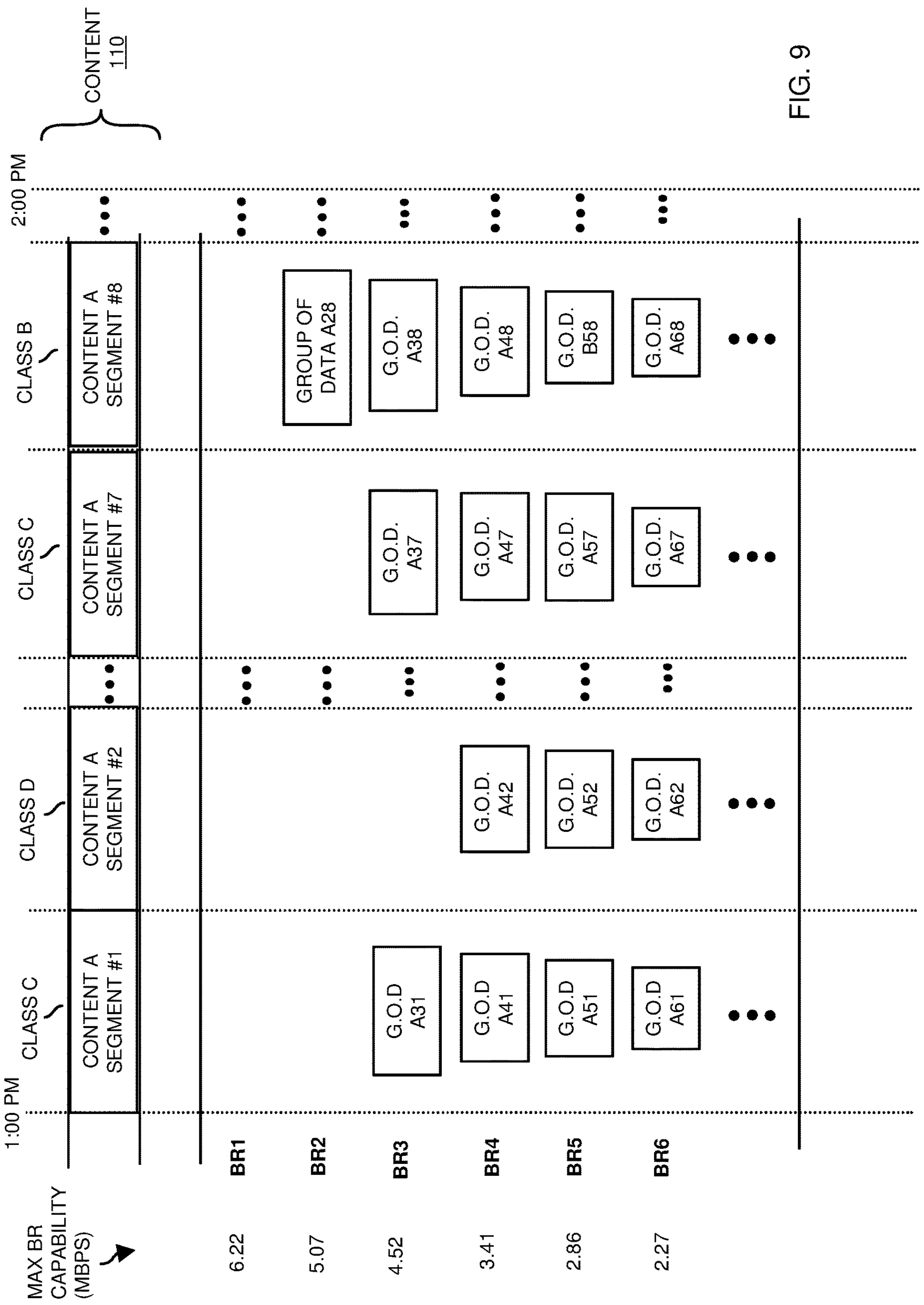
FIG. 9 is an example diagram illustrating adaptive encoding of segments of content into a varying number of bit rate encoded data streams according to embodiments herein.

A general example is presented and discussed in FIG. 9.

In one non-limiting example embodiment, the encoder resource 140 receives the content on data feed 105-1. The content analyzer resource 840 analyzes a relative complexity associated with each of the segments of content in a data stream. As discussed below in the following figures, based at least in part on a complexity of one or more segments, the encoder resource 140 varies a number of adaptive bit rate data streams that are produced for the segments.

FIG. 9 is an example diagram illustrating adaptive encoding of content into a varying number of data streams according to embodiments herein.

As previously discussed, the encoder resource 140 can receive content A for encoding. In this example, segments of content A are encoded into a varying number of different bit rate data streams depending on a complexity of the respective segment (or group of segments) under test.

As mentioned, in one embodiment, the content analyzer resource 840 analyzes the segments of content to determine a complexity of each segment. The complexity can be measured in any suitable manner. For example, the content analyzer resource 840 can determine a magnitude of complexity of the segments based on parameters such as: variations of pixels settings within the same frame, setting variations amongst the same pixels across multiple frames, amount of motion in the sequence of images, changes in pixel settings amongst the sequence of images, etc.

In one embodiment, the content analyzer resource 840 first decodes the received segments of content on the data feed 105-1. The content analyzer resource 840 categorizes and/or classifies a segment as being of a particular complexity. By way of a non-limiting example, the most complex segments are assigned to class A, the next most complex segments are assigned to class B, the next most complex segments are assigned to class C, most complex segments are assigned to class D, the next most complex segments are assigned to class E, the next most complex segments are assigned to class F, etc., down to a lowest complexity class.

In one embodiment as discussed below, the encoder resource 140 encodes the segments of content at different adaptive bit rates depending on the complexity of the respective content to be encoded. For example, highly complex segments of content such as those falling in complexity class A can be encoded in a range a of adaptive bit rates between BR1 and BR10 (i.e., up to bit rate BR1); less complex segments of content such as those falling in complexity class B can be encoded in a range a of adaptive bit rates between BR2 and BR10 (i.e., up to bit rate BR2); segments of content such as those falling in complexity class C can be encoded in a range a of adaptive bit rates between BR3 and BR10 (i.e., up to bit rate BR3); segments of content such as those falling in complexity class D can be encoded in a range a of adaptive bit rates between BR4 and BR10 (i.e., up to bit rate BR4); segments of content such as those falling in complexity class E can be encoded in a range a of adaptive bit rates between BR5 and BR10 (i.e., up to bit rate BR5); and so on.

For simplicity sake, assume that each of segments #1, #2, . . . are one or multi seconds in time duration. in this example embodiment, based on a respective analysis, assume that content analyzer resource 840 assigns segment #1 of the original content to complexity class C; assume that the content analyzer resource 840 assigns segment #2 to complexity class D; assume that content analyzer resource 840 assigns segment #7 of the original content to complexity class C; assume that content analyzer resource 840 assigns segment #8 of the original content to complexity class B; and so on.

In this example embodiment, encoder resource 140 encodes segment #1 at corresponding specified bit rates BR3-BR10 (e.g., groupings of data A31, A41, A51, A61, etc.) because the complexity of content A segment #1 does not warrant encoding at at higher bit rates BR1 and BR2. That is, encoding of the segment #1 at these higher bit rates (BR1 and BR2) may not necessarily provide any better rendition of video than would grouping of data A31.

In a similar manner, encoder resource 140 encodes segment #2 at appropriate corresponding bit rates BR4-BR10 (e.g., groupings of data A42, A52, A62, etc.) because, due to a complexity of content A segment #2, there is little or no need to encode content A segment #2 at higher bit rates BR1, BR2, and BR3.

Encoder resource 140 encodes segment #7 (assigned complexity class C) at appropriate bit rates BR3-BR10 (e.g., groupings of data A37, A47, A57, A67, etc.) because there is little or no need to encode content A segment #7 at higher bit rates BR1 and BR2.

Encoder resource 140 encodes segment #8 (assigned class B) at appropriate bit rates BR2-BR10 (e.g., groupings of data A28, A38, A48, A58, A68, etc.) because there is little or no need to encode content A segment #8 at the highest bit rate BR1.

Thus, embodiments herein can include: analyzing the segments of content to determine bandwidth requirements to transmit the segments of content on different bit rate data streams; encoding the segments of content in accordance with multiple different bit rates; and dynamically adjusting a number of different bit rate data streams into which the segments of content are encoded based at least in part on the bandwidth requirements associated with the segments. That is, for efficient encoding, the encoder resource 140 encodes the segment up to an appropriate bit rate depending on the bandwidth requirements of the original segment being encoded. Higher bit rate encoding can be eliminated when not needed or when it provides little or no playback benefit.

As previously discussed, any of one or more different types of appropriate resources can be configured to produce corresponding content access information specifying availability of the segments of content according to the varying number of bit rate data streams.

Figure 10:
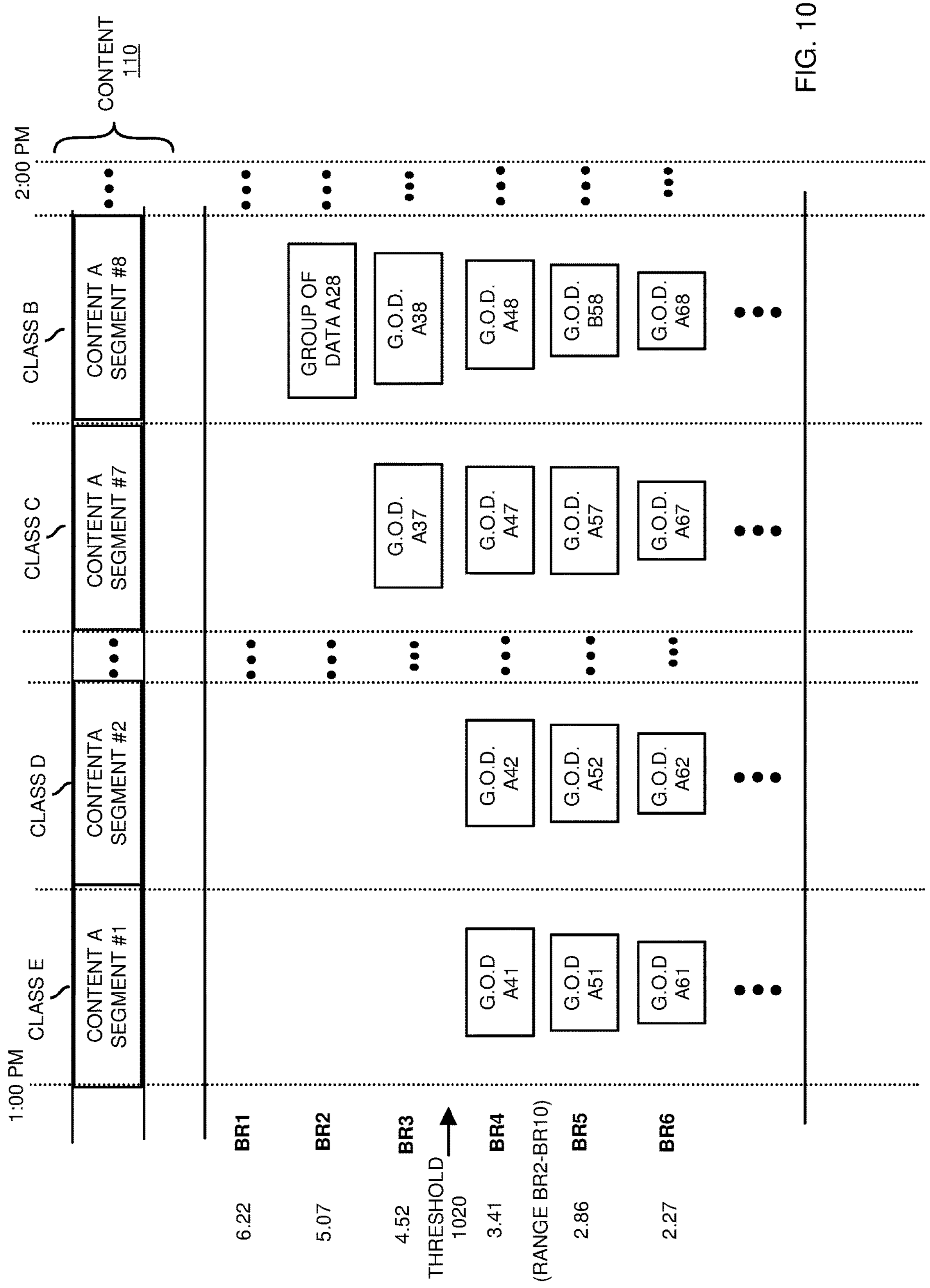
FIG. 10 is an example diagram illustrating adaptive encoding of segments of content into a varying number of data streams according to embodiments herein.

FIG. 10 is an example diagram illustrating adaptive encoding of content into a varying number of data streams according to embodiments herein.

In accordance with another embodiment, the encoder resource 140 can receive encoder control information 128 indicating to encode each of the segments of content A up to threshold value 1020 (e.g., BR4, BR5, BR6, etc.) unless the segments of content are classified as being above a complexity threshold value.

In this example embodiment, each of the segments of content A are encoded up to a threshold 1020 bit rate BR4 (e.g., the c is encoded at least at bit rates BR4, BR5, and BR6) but not necessarily at the higher bit rates BR3, BR2, and BR1 unless the complexity of the received segments indicates a need to do so.

For example, as shown, segment #1 and segment #2 are respectively detected as being class E and class D complexity. Segment #1 and segment #2 are therefore encoded up to highest bit rate BR4.

Segment #7 is classified at complexity class C and is therefore encoded at additional bit rate BR3 above threshold 1020 because the change in complexity of the content warrants encoding at the higher bit rate BR3 above the threshold 1020.

Segment #8 is classified at complexity class B and is therefore encoded at additional bit rates BR3 and BR2 above threshold 1020 because the change in complexity of the content warrants encoding at the higher bit rate BR3 above the threshold 1020.

Further, note that embodiments herein can include receiving encoder control information 128 indicating a range of multiple different bit rate data streams in which to potentially encode the segments of content. The range can be received in addition to or in lieu of the threshold value 1020. In such an embodiment, the encoder resource 140 dynamically adjust the number of different bit rate data streams to vary within the range as specified by the encoder control information depending on the magnitude of data bit information (e.g., transmission bandwidth requirements) included in each of the original segments in a manner as discussed above. As an example, the encoder resource 140 can be configured to be limited to producing encoded content (i.e., groupings of data) in the range including BR2-BR10, with a threshold value 1020 of up to as high as bit rate BR4. When a respective segment such as content A segment #8 is detected as being above a complexity threshold value, the encoder resource 140 encodes the segments of content up to and including bit rate BR2 since this is the maximum bit rate in the allowed range BR2-BR10.

Figure 11:
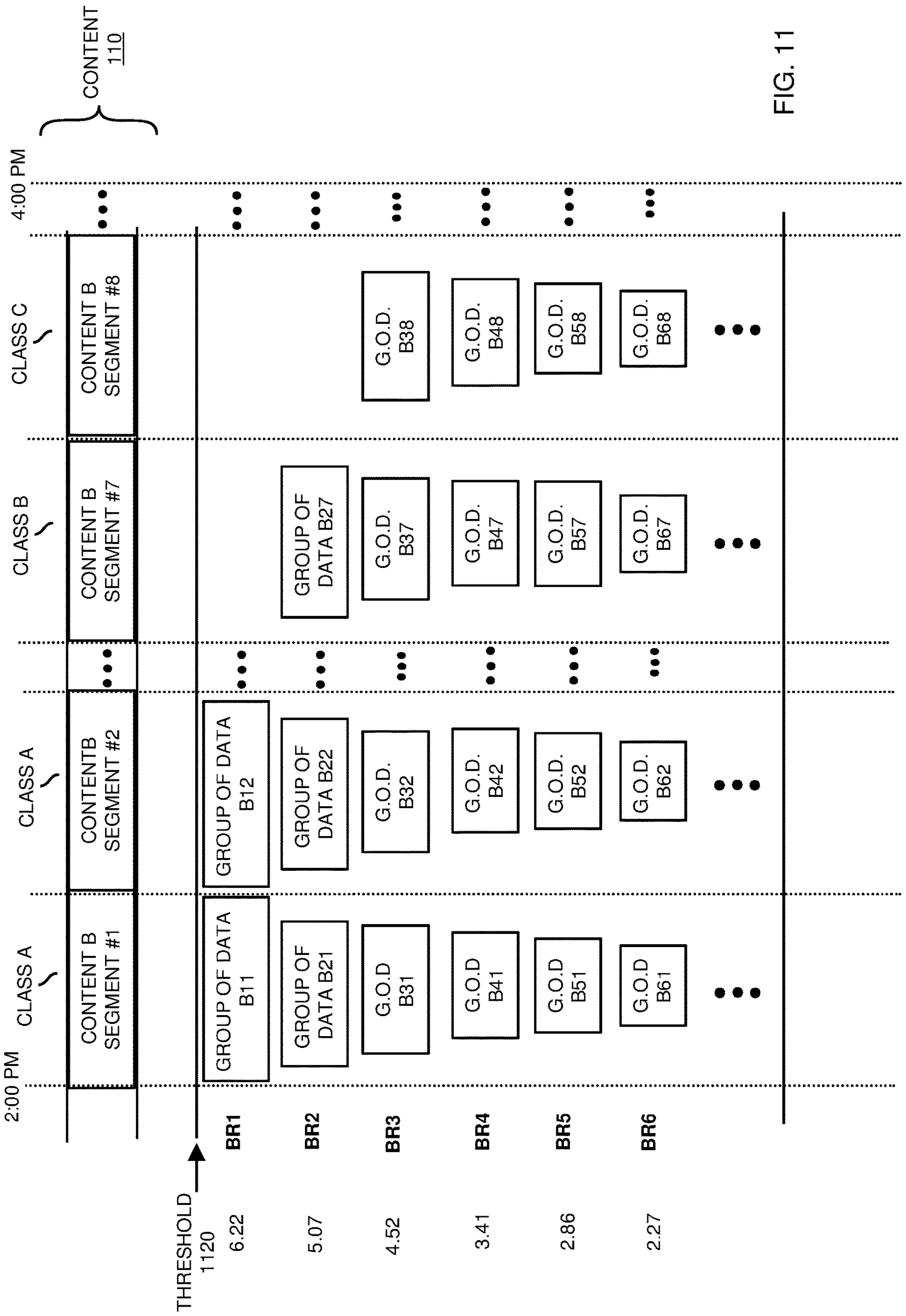
FIG. 11 is an example diagram illustrating adaptive encoding of segments of content into a varying number of data streams according to embodiments herein.

FIG. 11 is an example diagram illustrating adaptive encoding of content into a varying number of data streams according to embodiments herein.

In this example, assume that the encoder control information 128 indicates to encode the content B in accordance with bit rates BR1 through BR10 as previously discussed. Threshold value 1120 is thus set to the highest level of quality.

In accordance with encoder control information 128, the encoder resource 140 sets the threshold value 1120 to the highest level of quality (i.e., bit rate BR1 or 6.22 mbps). Content analyzer resource 840 analyzes the segments to determine whether to reduce the highest bit rate at which the segments are encoded. For example, in a manner as previously discussed, assume that the content analyzer resource 840 detects that segment #1 falls in complexity class A; the content analyzer resource 840 detects that segment #2 falls in complexity class A; the content analyzer resource 840 detects that segment #7 falls in complexity class B; the content analyzer resource 840 detects that segment #8 falls in complexity class C; and so on.

As shown, embodiments herein include encoding one or more segments of content at fewer bit rates below a threshold 1120 lower in cases where the complexity associated with the respective segments does not warrant encoding the segments at the highest one or more bit rates. That is, in this example embodiment, the encoder resource 140 encodes segment #1 at bit rates BR1, BR2, BR3, BR4, BR5, BR6, etc.; the encoder resource 140 encodes segment #2 at bit rates BR1, BR2, BR3, BR4, BR5, BR6, etc.; the encoder resource 140 encodes segment #7 at bit rates BR2, BR3, BR4, BR5, BR6, etc.; the encoder resource 140 encodes segment #8 at bit rates BR3, BR4, BR5, BR6, etc.; and so on.

Accordingly, embodiments herein can include: receiving a first segment of the content; encoding the first segment onto a first set of multiple bit rate data streams; receiving a second segment of the content, the second segment logically disposed in a sequence following the first segment; and in response to detecting that a magnitude of data bit information in the second segment of content is less than a threshold value, encoding the second segment onto a second set of data streams including fewer bit rate data streams than the first set.

Figure 12:
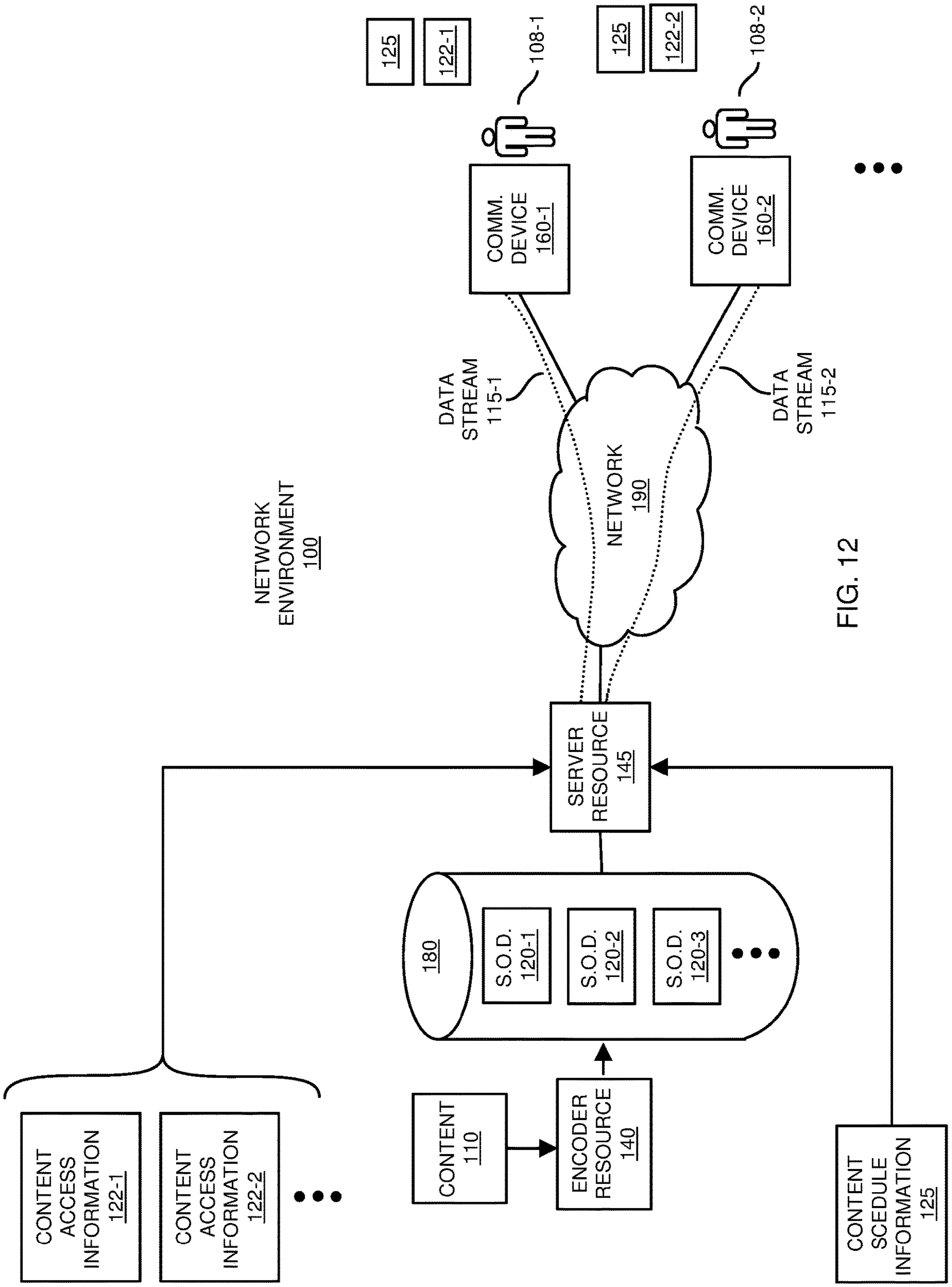
FIG. 12 is an example diagram illustrating a network environment in which to distribute content at varying bit rates according to embodiments herein.

FIG. 12 is an example diagram of a network environment facilitating novel generation of and distribution of encoded at different bit rates or levels of quality according to embodiments herein.

As shown, network environment 100 includes content 110, repository 180, server resource 145 (e.g., one or more servers), network 190 such as a cable network or shared cable network, and communication devices 160 operated by respective users 108 (e.g., subscribers).

In this example embodiment, the repository 180 data streams 120 derived from content 110. Content 110 can be any suitable type of playable information such as video information, audio information, etc.

In general, server resource 140 initiates distribution of the different portions of the streams of data 120 over network 190 to the communication devices 160. In one embodiment, the communication devices 160 are playback devices or include media players configured to play back a rendition of the content 110 in accordance with the different levels of quality of data received from the server resource 140.

Note that network 190 can include any suitable type of resource or data communication device supporting distribution of data from server resource 140 to each of one or more users 108 located in the network environment 100. For example, in one embodiment, network 190 includes resources such as routers, core networks, edge servers, storage resources, switches, etc., facilitating distribution of content encoded at different levels of quality according to one or more suitable Internet data transport protocols (e.g., IP protocols).

By way of a non-limiting example, network 190 can be or include a content delivery network.

In one embodiment, if desired, network 190 can include resources to cache data at respective edge nodes in proximity to the client devices (e.g., communication devices 160). Initially, a cache may be empty in which case data is retrieved from a remote source such as a server resource 145. The edge nodes in network 190 can be configured to cache certain adaptive bit rate segments transmitted through the edge node to corresponding communication devices 160. On a subsequent request, and to increase an efficiency of the network 190, instead of retrieving adaptive bit rate segments from remote server 145, the communication devices 160 can retrieve the encoded segments of content at different bit rates from edge servers. As mentioned, a client can retrieve the adaptive bit rate segments of content from the server resource 140 if the content is not available in a nearby edge server.

Communication devices 160 can be any suitable type of processing device such as a personal computer, television, Apple™ products, etc., including a respective media player configured to playback media to a user.

By further way of a non-limiting example, the communication devices can be configured to request retrieval of the different segments of encoded content using any of one or more suitable IP protocols. One application of receiving data stream 115 is a video on demand type or IPTV type of application in which the respective users request retrieval of content over one or more communication links that support conveyance of data packets transmitted on a packet-switched network. In such an instance, the encoded segments of content are transmitted to clients in one or more data packets. Each client can request retrieval of the different adaptive bit rate segments of encoded content based on a suitable protocol such as the HTTP (HyperText Transport Protocol) request messages. Thus, the communication devices 160-1 can establish a communication session with server resource 145 and retrieve content encoded at the different bit rates.

In such an instance, in response to the request, a respective communication device may initially request the lower levels of quality of the available adaptive bit rate content 110 to immediately play back requested content. After sufficient buffering, a decoder in the communication device can request the segments of the content at the higher available bit rates if they are available. Subsequent to startup and initial playback of the content, the decoder continuously may request the best quality of content (e.g., highest available bit rate) for playback at any given time for the available resources. Accordingly, a corresponding decoder in the communication device 160 can be configured to control a bit rate of receiving content via selection of different bit rate encoded segments of content.

As previously discussed, the server resource 145 can be configured to distribute corresponding content access information to one or more subscribers in the cable network environment. Via the content access information, the subscribers selectively retrieve encoded segments of content from the varying number of bit rate data streams as produced by the encoder resource 140.

In accordance with further embodiments, one or more of the users 108 can receive the available content over a shared cable network. In one embodiment, the subscribers (e.g., users 108) can independently make requests to retrieve segments of the content 110 at different levels of quality over an IP (Internet Protocol) portion of a cable bandwidth dedicated for retrieval and viewing video.

As an alternative to IPTV streaming of content, a portion of the cable bandwidth in the cable network can be dedicated to so-called linear channel programming in which the subscribers tune their respective communication devices (e.g., set-top boxes) to a broadcast channel to receive the encoded content. The network 190 can be or include a cable network over which the content 110 encoded at different levels of quality is broadcasted to each of multiple users in a so-called service group. In such an embodiment, the users 108 configure their respective communication devices 160 to tune to an available channel and play back selected content.

In accordance with further embodiments, note that if the demand for the IP bandwidth portion of the cable becomes sufficiently high, the cable provider can dynamically adjust an allocation of an amount of cable bandwidth that is available for video on demand and the content that is encoded at the higher adaptive bit rates.

In general, communication devices 160 communicate over network 190 with server resource 145. As mentioned, and by way of a non-limiting example, each of the communication devices 160 can be or include any suitable type of mobile or non-mobile device such as a cellular phone device, mobile device, personal digital assistant, touch pad device, portable computer, wire-line telephone, cable set-top box, television, display screen, wireless phone, wireless mobile device, television, etc.

Network 190 can be and/or include any suitable type of network supporting communications amongst communication devices 160 and or other resources in communication system 100. For example, network 190 can be and/or include a phone network, cellular phone network, Internet, local area network, public switched telephone network, cable network, hybrid-fiber coaxial network, etc.

As mentioned, in accordance with one embodiment, communications over network 190 can include data packets (or groupings of data packets) that are packet-switched in accordance with one or more different Internet or web-based network routing protocols. Communications over network 190 also can be transmitted over dedicated links. The available bandwidth in which to convey content 110 encoded at the different levels of quality can vary over time.

The following textual description describes functionality supported by communication device 160-1. In general, the user 108-1 operates the communication device 160-1 to retrieve content 110 encoded at different levels of quality.

As mentioned, in accordance with one embodiment in which the client (e.g., communication device 160) controls retrieval of different bit rate encoded segments of content, the server resource 145 (e.g., one or more servers) distributes portions of the data streams (e.g., data stream 120-1, data stream 120-2, data stream 120-3, etc.) in data stream 115-1 based on input from the client.

By way of a non-limiting example, the data stream 115-1 can be a so-called adaptive bit rate data stream in which the level of quality of data transmitted to the communication device 160-1 varies depending on one or more parameters such as available network bandwidth in network 190, ability of a decoder in the communication device to store and/or process the adaptive bit rate data stream, etc. As previously discussed, the content access information can indicate which segments of the content are available and at what bit rates the segments of content are available.

Note that the other communication devices 160 such as communication device 160-2 in network environment 100 can support similar functionality for each of different end users operating respective playback devices. In other words, the user 108-2 at communication device 160-2 can select content for retrieval. In such an instance, the server resource 140 conveys the content 110 encoded at multiple levels of quality over network 190 in data stream 115-2 to the communication device 160-2 in accordance with adaptive bit rate segments selected by the communication device 160-2. The communication device 160-2 decodes the data stream 115-2 and plays back the content 110 on a respective media player.

Figure 13:
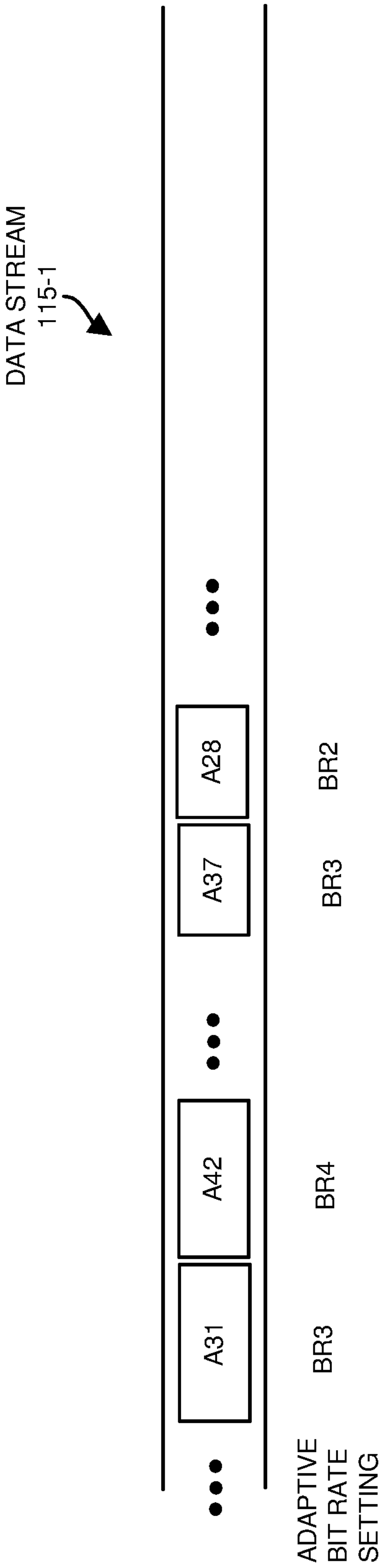
FIG. 13 is an example diagram illustrating selection, interleaving, and delivery of segments of content encoded at different levels of quality according to embodiments herein.

FIG. 13 is an example diagram illustrating retrieval of encoded segments of content at different levels of quality according to embodiments herein.

In this example embodiment, assume that the communication device 160-1 initiates retrieval of content A as encoded in FIG. 9. Assuming that there is no network bandwidth limitation preventing retrieval of the highest level of quality of encoded segments for content A. The communication device 160-1 initiates retrieval of the encodes segments of content (e.g., groupings of data) A31, A42, . . . , A37, A28, etc. If congestion occurs, the communication device 160-1 can initiate retrieval and playback of lower bit rate encoded segments of content. Playback of the lower bit rate encoded segments results in a lower level of quality playback of images on a display screen.

Figure 14:
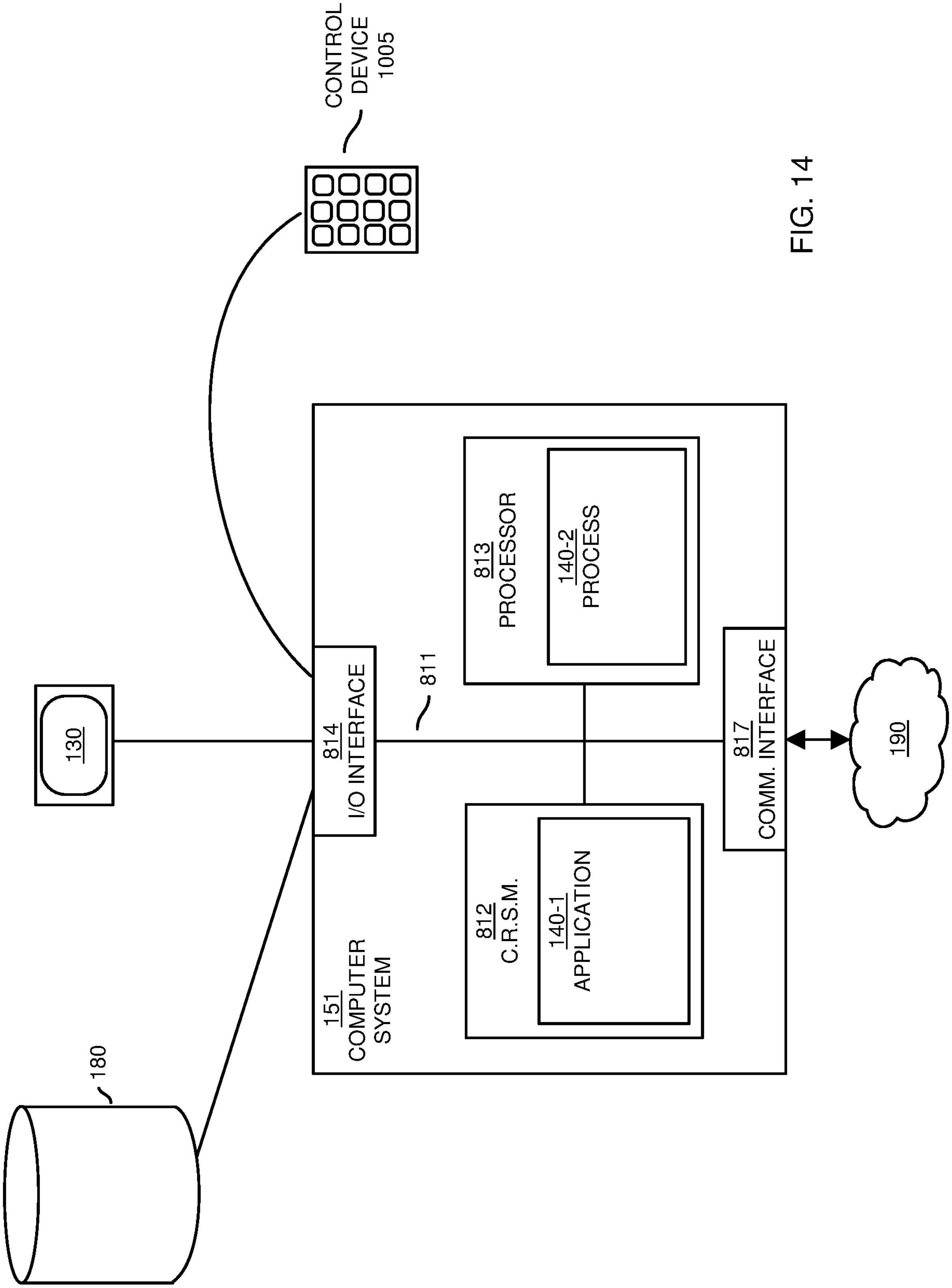
FIG. 14 is a diagram illustrating an example hardware architecture including a processor and an encoded hardware storage medium according to embodiments herein.

FIG. 14 is an example block diagram of a computer system for implementing any of the operations as discussed herein according to embodiments herein.

Computer system 151 can reside in any of the resources as discussed herein such as encoder resource 140, server resources, each of communication devices 160, etc.

As shown, computer system 151 of the present example can include an interconnect 811 that couples computer readable storage media 812 such as a non-transitory type of media (i.e., any type of hardware storage medium) in which digital information can be stored and retrieved, a processor 813, I/O interface 814, and a communications interface 817.

I/O interface 814 provides connectivity to a repository 180 and, if present, other devices such as a playback device 130, keypad 1005, a computer mouse, etc.

Computer readable storage medium 812 can be any hardware storage device such as memory, optical storage, hard drive, floppy disk, etc. In one embodiment, the computer readable storage medium 812 stores instructions and/or data.

Communications interface 817 enables the computer system 150 and processor 813 to communicate over a resource such as network 190 to retrieve information from remote sources and communicate with other computers. I/O interface 814 enables processor 813 to retrieve stored information from repository 180.

As shown, computer readable storage media 812 is encoded with application 140-1 (e.g., software, firmware, etc.) executed by processor 813. Application 140-1 (e.g., encoder application) can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in application 140-1 stored on computer readable storage medium 812.

Execution of the application 140-1 produces processing functionality such as process 140-2 (e.g., encoder process) in processor 813. In other words, the process 140-2 associated with processor 813 represents one or more aspects of executing application 140-1 within or upon the processor 813 in the computer system 150.

Those skilled in the art will understand that the computer system 150 can include other processes and/or software and hardware components, such as an operating system that controls allocation and use of hardware resources to execute application 140-1.

In accordance with different embodiments, note that computer system may be any of various types of devices, including, but not limited to, a set-top box, a television, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 150 may reside at any location or can be included in any suitable resource in network environment 100 to implement functionality as discussed herein.

Functionality supported by the different resources will now be discussed via flowcharts in FIGS. 15 and 16. Note that the steps in the flowcharts below can be executed in any suitable order.

Figure 15:
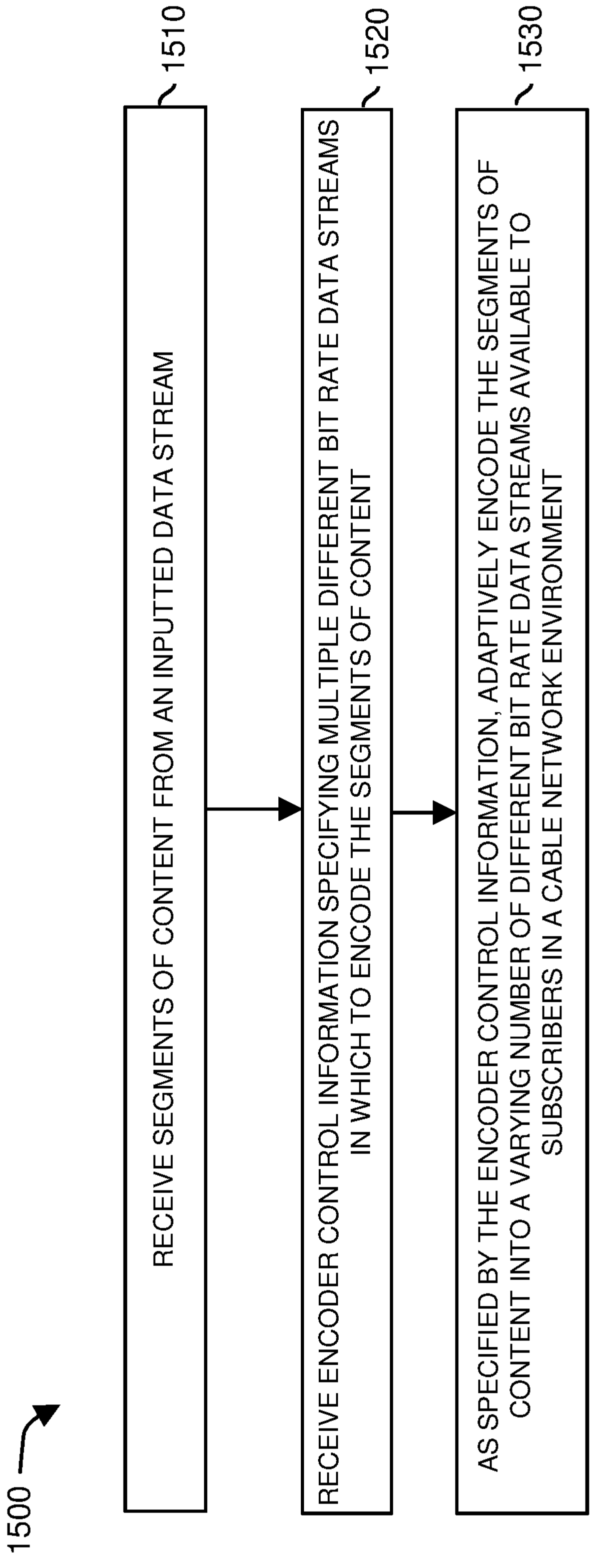
FIGS. 15-16 are flowcharts illustrating example methods according to embodiments herein.

FIG. 15 is a flowchart 1500 illustrating an example method of varying the levels of quality of encoded segments of content according to embodiments. Note that there will be some overlap with respect to concepts as discussed above.

In processing block 1510, the encoder resource 140 receives segments of content from data feed 105-1 (e.g., an inputted data stream).

In processing block 1520, the encoder resource 140 receives encoder control information 128 specifying multiple different bit rates in which to encode the segments of content.

In processing block 1530, as specified by the encoder control information 128, the encoder resource 140 adaptively encodes the segments of content into a varying number of different bit rate data streams (e.g., different bit rate encoded segments of content) available to subscribers in a network environment such as a cable network environment.

Figure 16:
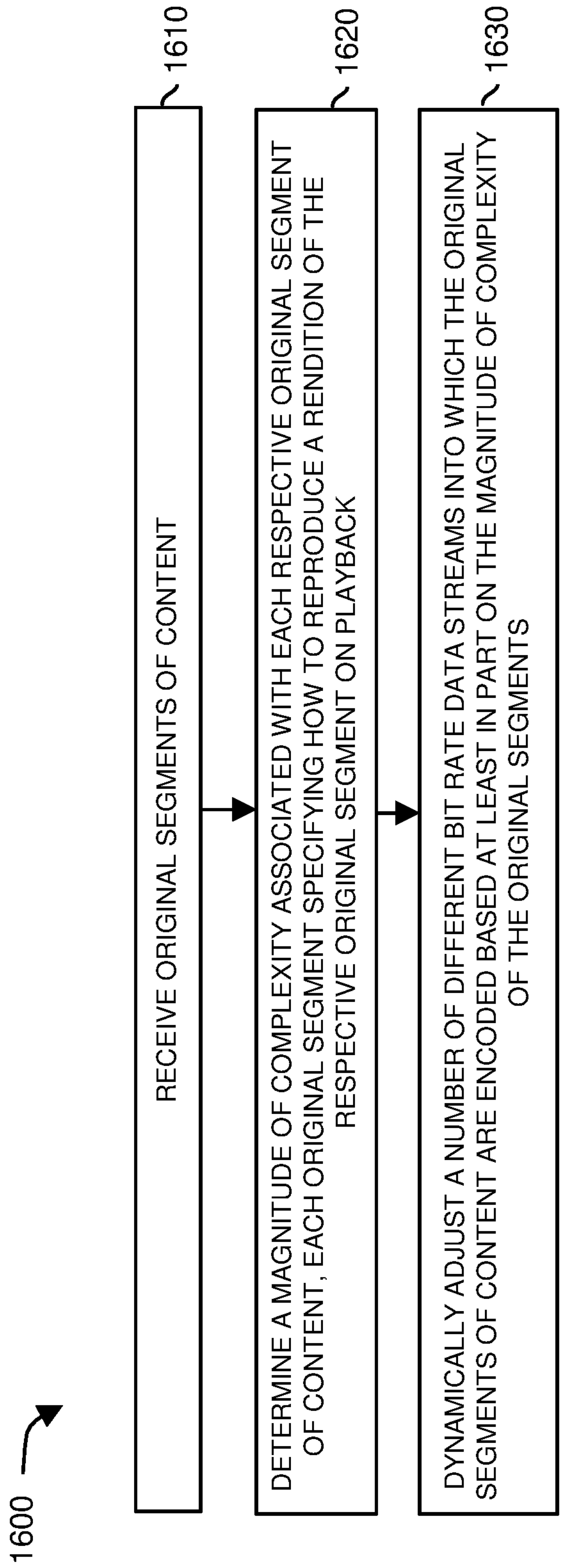

FIG. 16 is a flowchart 1600 illustrating an example method of varying the levels of quality of encoded content according to embodiments herein. Note that there will be some overlap with respect to concepts as discussed above.

In processing block 1610, the encoder resource 140 receives original segments of content on a communication link such as data feed 105-1.

In processing block 1620, the encoder resource 140 analyzes a complexity of each respective original segment of content. The data bit information in the respective segment specifies how to reproduce a rendition of the respective original segment on playback.

In processing block 1630, the encoder resource 140 dynamically adjusts a number of different bit rate data streams into which the original segments of content are encoded based at least in part on a magnitude of complexity of the respective original segments.

Note again that techniques herein are well suited for varying bit rates of encoding segments of content at different levels of quality in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:

receiving encoder control information indicating encoding of segments of content into multiple different bit rate data streams, the control information further indicating the encoding of the segments of content up to a varying bit rate level to produce the multiple different bit rate data streams;

producing content access information, the content access information indicating availability of the segments of content encoded up to the varying bit rate level;

distributing the content access information to multiple subscribers in a network environment;

wherein the content access information indicates encoding of a first segment of the content at a first bit rate level of the varying bit rate level and encoding of a second segment of the content at the first bit rate level; and wherein the content access information indicates encoding of the first segment of the content at a second bit rate level of the varying bit rate level and absence of encoding of the second segment of the content at the second bit rate level, the second bit rate level being greater than the first bit rate level.

2. The method as in claim 1, wherein the multiple different bit rate data streams are retrievable by the multiple subscribers via the distributed content access information.

3. The method as in claim 1, wherein each of the multiple subscribers selectively retrieve the encoded segments of content from the multiple different bit rate data streams.

4. The method as in claim 1 further comprising:

as specified by the encoder control information, varying a number of bit rates of encoding each of the segments of content to produce the multiple different bit rate data streams.

5. The method as in claim 1 further comprising:

in accordance with the varying bit rate level, varying bit rates of encoding the segments of content in the multiple different bit rate data streams based at least in part on a time of day at which the segments of content are received from an inputted data stream.

6. The method as in claim 1 further comprising:

dynamically adjusting bit rates at which the segments of the content are encoded based at least in part on bandwidth requirements associated with the segments.

7. The method as in claim 1 further comprising:

receiving the encoder control information from an out-of-band signal with respect to an inputted data stream on which the segments of content are received.

8. The method as in claim 1, wherein the encoder control information indicates to terminate encoding the segments of content on a selected one of the multiple different bit rate data streams to free bandwidth in a network over which portions of the encoded data streams are transmitted.

9. The method as in claim 1, wherein the multiple different bit rate data streams include a first bit rate data stream and a second bit rate data stream, the first bit rate data stream encoded at a higher bit rate than the second bit rate data stream; and wherein a first segment of the first bit rate data stream is not produced at a particular bit rate in response to a condition in which an appropriate level of image quality for the first segment is provided by a respective segment of the second bit rate data stream.

10. The method as in claim 1, wherein each respective segment of the segments of content is encoded up to a different bit rate level depending on complexity of encoding the respective segment.

11. The method as in claim 1, wherein the multiple different bit rate data streams include a first bit rate data stream and a second bit rate data stream.

12. The method as in claim 1, wherein the content access information indicates inclusion of the encoded first segment of the content at the first bit rate level and the encoded second segment of content at the first bit rate level in a first bit rate data stream; and wherein the content access information indicates inclusion of the encoded first segment of content at the second bit rate level in the second bit rate data stream and the exclusion of encoding of the second segment of content at the second bit rate level in a second bit rate data stream.

13. The method as in claim 12, wherein the first segment of the content is encoded up to the second bit rate level in response to detecting that a magnitude of encoding complexity of the first segment of the content is greater than a magnitude of encoding complexity of the second segment of the content.

14. The method as in claim 1, wherein each respective segment of the segments of the content is encoded up to a different bit rate level depending on complexity encoding the respective segment.

15. The method as in claim 1, wherein the multiple different bit rate data streams include a first bit rate data stream and a second bit rate data stream; and wherein the content access information indicates that the first bit rate data stream includes encoding of a greater number of instances of the segments of the content than the second bit rate data stream.

16. A system comprising:

processing hardware operative to:

receive encoder control information indicating encoding of segments of content into multiple different bit rate data streams, the control information further indicating the encoding of the segments of content up to a varying bit rate level to produce the multiple different bit rate data streams;

produce content access information, the content access information indicating availability of the segments of content encoded up to the varying bit rate level;

distribute the content access information to multiple subscribers in a network environment;

wherein the content access information indicates encoding of a first segment of the content at a first bit rate level of the varying bit rate level and encoding of a second segment of the content at the first bit rate level; and wherein the content access information indicates encoding of the first segment of the content at a second bit rate level of the varying bit rate level and absence of encoding of the second segment of the content at the second bit rate level, the second bit rate level being greater than the first bit rate level.

17. The system as in claim 16, wherein the segments of content are encoded into the varying number of different bit rate data streams with respect to a threshold value.

18. The system as in claim 16, wherein the processing hardware is further operative to:

as specified by the encoder control information, vary the number of bit rates of encoding the segments of content.

19. The system as in claim 16, wherein the processing hardware is further operative to:

vary bit rates of encoding the segments of content based at least in part on a time of day at which the segments of content are received from an inputted data stream.

20. The system as in claim 16, wherein the processing hardware is further operative to:

dynamically adjust the number of different bit rate data streams into which the segments of content are encoded based at least in part on bandwidth requirements associated with the segments.

21. The system as in claim 16, wherein the processing hardware is further operative to:

receive the encoder control information from an out-of-band signal with respect to an inputted data stream on which the segments of content are received.

22. The system as in claim 16, wherein the encoder control information indicates to eliminate encoding the segments of content on a selected one of the multiple different bit rate data streams to free bandwidth in a network over which portions of the encoded data streams are transmitted.

23. The system as in claim 16, wherein the varying number of different bit rate data streams include a first bit rate data stream and a second bit rate data stream, the first data stream encoded at a higher bit rate than the second data stream; and wherein a first segment of the first data stream is not produced at a particular bit rate in response to a condition in which an appropriate level of image quality for the first segment is provided by a respective segment of the second data stream.

24. A method comprising:

receiving encoder control information indicating encoding of segments of content into multiple different bit rate data streams, the control information further indicating the encoding of the segments of content up to a varying bit rate level to produce the multiple different bit rate data streams;

producing content access information, the content access information indicating availability of the segments of content encoded up to the varying bit rate level;

distributing the content access information to multiple subscribers in a network environment;

wherein the multiple different bit rate data streams include a first bit rate data stream encoded at a first bit rate and a second bit rate data stream encoded at a second bit rate;

wherein the segments of content include a first segment of content and a second segment of content; and wherein the content access information indicates: i) that the first bit rate data stream includes encoding of the first segment of content at the first bit rate and encoding of the second segment of content at the first bit rate, and ii) that the second bit rate data stream includes encoding of the first segment of content at the second bit rate and excludes encoding of the second segment of content at the second bit rate.

* * * * *